United States Patent
Johnson et al.

(10) Patent No.: US 11,809,617 B2
(45) Date of Patent: Nov. 7, 2023

(54) SYSTEMS AND METHODS FOR GENERATING DYNAMIC OBSTACLE COLLISION WARNINGS BASED ON DETECTING POSES OF USERS

(71) Applicant: Meta Platforms Technologies, LLC, Menlo Park, CA (US)

(72) Inventors: Samuel Alan Johnson, Redwood City, CA (US); Mahdi Salmani Rahimi, San Francisco, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 68 days.

(21) Appl. No.: 17/409,022

(22) Filed: Aug. 23, 2021

(65) Prior Publication Data

US 2021/0382547 A1 Dec. 9, 2021

Related U.S. Application Data

(63) Continuation of application No. 16/663,141, filed on Oct. 24, 2019, now Pat. No. 11,099,638.

(51) Int. Cl.
*G06F 3/01* (2006.01)
*G06F 3/0346* (2013.01)
*G08B 21/02* (2006.01)

(52) U.S. Cl.
CPC ............ *G06F 3/012* (2013.01); *G06F 3/0346* (2013.01); *G08B 21/02* (2013.01)

(58) Field of Classification Search
CPC ........ G08B 21/02; G06F 3/0346; G06F 3/012
See application file for complete search history.

(56) References Cited

U.S. PATENT DOCUMENTS

| | | | |
|---|---|---|---|
| 10,261,595 B1 | 4/2019 | Kin | |
| 11,099,638 B2 * | 8/2021 | Johnson | ................ G06F 3/0346 |
| 2016/0332059 A1 | 11/2016 | Seeff | |
| 2018/0126241 A1 | 5/2018 | Hung et al. | |
| 2019/0107721 A1 | 4/2019 | Scott et al. | |
| 2019/0325274 A1 | 10/2019 | Balan et al. | |

OTHER PUBLICATIONS

Non-Final Office Action on U.S. Appl. No. 16/663,141 dated Nov. 4, 2020 (12 pages).
Notice of Allowance on U.S. Appl. No. 16/663,141 dated Apr. 20, 2021 (5 pages).

* cited by examiner

*Primary Examiner* — Abbas I Abdulselam
(74) *Attorney, Agent, or Firm* — Foley & Lardner LLP

(57) ABSTRACT

A system includes processing circuitry configured to receive sensor data regarding a user operating a head mounted display (HMD). The processing circuitry is configured to identify a plurality of reference points of a pose of the user based at least on the sensor data. The processing circuitry is configured to apply one or more models to the plurality of reference points to determine a type of the pose of the user. The processing circuitry is configured to select a mode of operation of the HMD responsive to the type of the pose.

20 Claims, 4 Drawing Sheets

SYSTEMS AND METHODS FOR GENERATING DYNAMIC OBSTACLE COLLISION WARNINGS BASED ON DETECTING POSES OF USERS

CROSS-REFERENCE TO RELATED APPLICATIONS

The present application claims priority to and is a continuation of U.S. patent application Ser. No. 16/663,141, filed Oct. 24, 2019, the disclosure of which is incorporated herein by reference in its entirety.

FIELD OF THE DISCLOSURE

The present disclosure relates generally to virtual reality (VR) systems. More particularly, the present disclosure relates to systems and methods for generating dynamic obstacle collision warnings based on detecting poses of users.

BACKGROUND

The present disclosure relates generally to virtual reality (VR) systems and augmented reality (AR) systems. AR and VR systems can be used to present various images, including three-dimensional (3D) images, to a user. For example, AR and VR headsets can be used to present images to the user in a manner that can be perceived as a virtual, immersive environment. The VR headset may occlude the user's view of a real world environment in which the user is located.

SUMMARY

Various aspects of the present disclosure relate to systems and methods that can dynamically generate and modify obstacle collision warnings using sensor data of the user of a head mounted display (HMD) or head worn display (HWD), such as a device used to implement a VR system. A modality (e.g., type) of pose that the user is positioned in can be determined from the sensor data and used to modify how the warnings regarding collisions are generated. For example, VR headsets may be used differently depending on whether the user is standing, sitting, or lying down. A model can be generated that uses position and acceleration telemetry from the headset and the controllers to determine which of these use modes the user is currently employing. Using the sensor data, these determinations of modality, or various combinations thereof, various functionality can be implemented. For example, if the user is laying down, the warning system can be disabled, which can reduce usage of computational capacity. If the user is sitting, there may be a lesser likelihood that the user will perform relatively large movements, enabling the thresholds associated with generating the warning to be adjusted so that the warning space is made smaller, or so that there is a smaller threshold for when to warn the user if they are nearing a boundary. The modalities can include whether the user is sitting, standing, or lying down. The modalities can be related to sensor data regarding positioning and movement of the user's hands and head, such as sensor data detected by one or more sensors of an HMD.

The system can provide visual and/or audio cues to the user regarding whether the user is about to contact real world obstacles and boundaries such as walls or objects in the real world environment. The system can operate using adjustable parameters such as distance or time-based thresholds (e.g., distance or time to collision) at which the system generates the cues or increases the cues to a particular magnitude.

The system can use a machine learning model trained to generate a prediction of the user's modality or position, in some embodiments. The machine learning model can be trained using information from a skeletal inference model. The skeletal inference model can use position data from the headset and hand controllers to infer a skeletal pose of the user, and thus the corresponding modality. For example, the skeletal inference model can use statistical relationships regarding distances between the hands and head to infer the skeletal pose. The skeletal inference model can map the position data to expected skeletal poses. The position data can include six degree of freedom transform data from the headset and controllers. The machine learning model can also be trained using training data based on motion capture data to which virtual headsets and controllers are affixed. The machine learning model can maintain state information, which can be used to increase confidence in the detected modality. Because the machine learning model can operate as a black box, the model can take into account any of a variety of motion data parameters, such as position, velocity, acceleration, as well as time-averaged values of such parameters over time, to perform modality detection.

When in use, the machine learning model can use position data from the headset and controllers and the skeletal inference model to predict the modality. The system can calibrate to specific users using a body model that generates confidence over time regarding the user's positioning (e.g., height, reach, etc.). The system can detect transitions between modalities, which can enable more effective triggering of changes of how the guardian operates. For example, the machine learning model can be trained using training data that identifies modality transitions (e.g., when a user moves from standing up to sitting down), and thus in operation output an indication of a modality transition.

The system can modify how the warning generation operates based on the detected modality. For example, the system can decrease the sensitivity or obtrusiveness of the guardian as the user moves into less active modalities (e.g., sitting or lying), such as to decrease the distance threshold from obstacles at which to trigger the guardian when the user is lying down, or change how the warning is used to warn about objects in the periphery of the user's field of view or behind the user. The system can modify a region of the user's field of view that the guardian occupies depending on the modality, such as to expand the guardian if the user is standing or moving.

At least one aspect relates to a method. The method can include receiving, by processing circuitry, sensor data regarding a user operating a head mounted display (HMD), identifying, by the processing circuitry, a plurality of reference points of a pose of the user based at least on the sensor data, applying, by the processing circuitry, one or more models to the plurality of reference points to determine a type of the pose of the user, and selecting, by the one or more processors, a mode of operation of the HMD responsive to the type of the pose.

At least one aspect relates to a system. The system can include processing circuitry configured to receive sensor data regarding a user operating a head mounted display (HMD), identify a plurality of reference points of a pose of the user based at least on the sensor data, apply one or more models to the plurality of reference points to determine a type of the pose of the user, and select a mode of operation of the HMD responsive to the type of the pose.

At least one aspect relates to a system. The system can include a head mounted display (HMD) device. The system can include one or more processors configured to receive sensor data regarding a user operating a head mounted display (HMD), identify a plurality of reference points of a pose of the user based at least on the sensor data, apply one or more models to the plurality of reference points to determine a type of the pose of the user, and select a mode of operation of the HMD responsive to the type of the pose.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
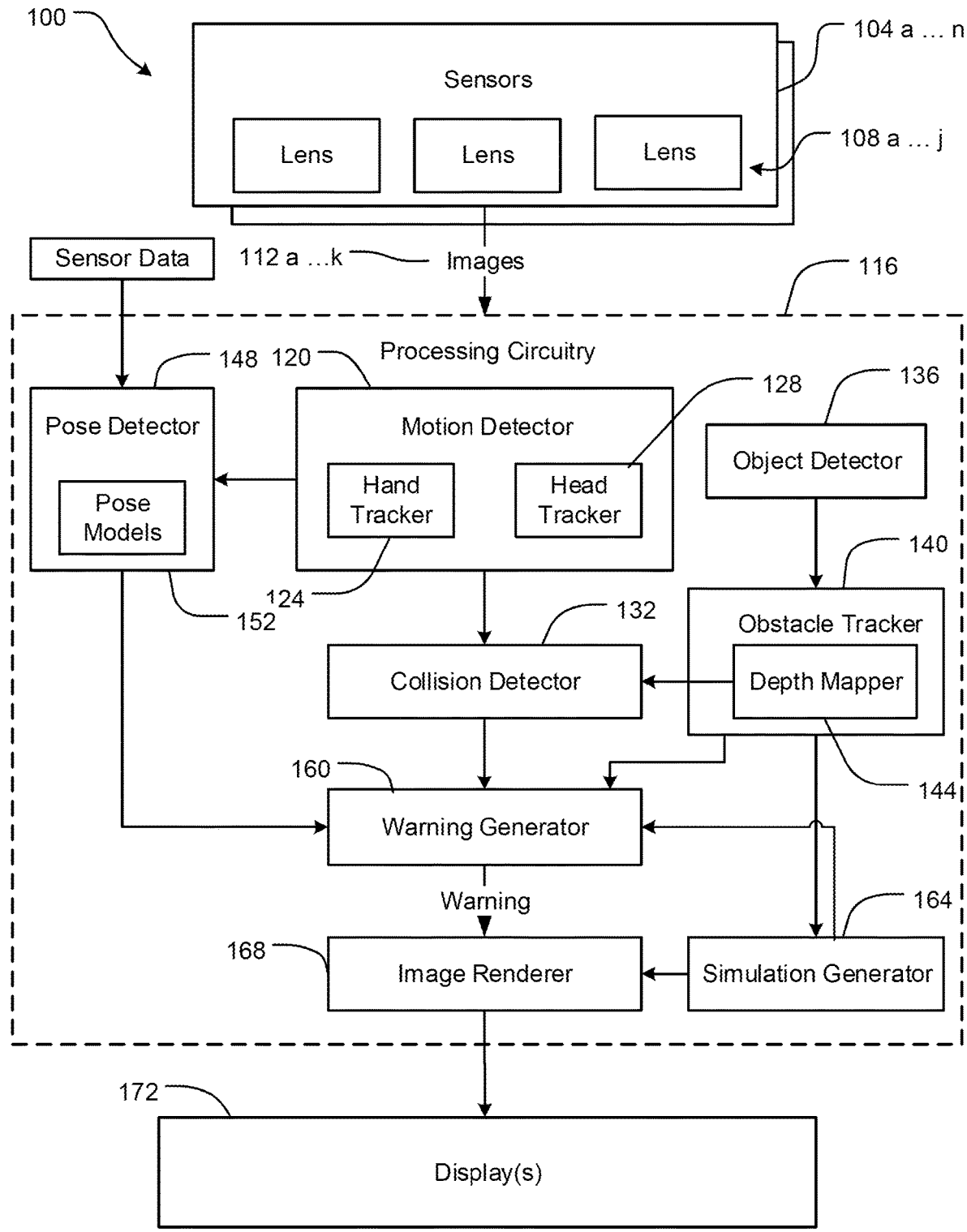
FIG. 1 is a block diagram of a display system according to an implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

AR and VR systems can use an HMD (may also be referred to as a head-worn display (HWD)) to present images to a user to represent a virtual environment (e.g., simulated environment). It can be useful for the user experience for the virtual environment to be immersive. The HMD can present the images so that the images are perceived with realistic depth. For example, the HMD can be used to present images that can be viewed stereoscopically, such as by sequentially or simultaneously presenting left eye images and right eye images, enabling a user to perceive a 3D environment. For example, the VR system can generate the images based on operating an application that generates display data regarding the virtual environment, and updates the display data responsive to interactions of the user with the virtual environment. Such interactions can include movement in the real world that is detected by motion sensors of the VR system, and interactions with items presented in the virtual environment. The VR system can detect a user moving by walking in the real world and moving a hand, and can generate and update the display data based on detecting such information. The VR system can include the HMD (e.g., headset), which can be worn by the user to present the display data to the user, as well as one or more hand devices, such as hand-held controllers, that can be manipulated by the user as the user interacts with the virtual environment. The HMD and hand device may each include motion sensors that can generate motion data, such as velocity or acceleration data, regarding movement of the head and hands of the user.

Wearing the HMD can obstruct the user's view of the obstacles in the real world environment. For example, users can accidentally strike, bump, walk into, or trip over obstacles or boundaries. Warnings, such as a safety overlay, can be presented to the user to help the user avoid such collisions. However, displaying the warnings too early or too frequently can result in loss of immersion, and can make it difficult to identify the significance of the warning if it is presented when the likelihood of collision is low. For example, immersion may be lost when representations of real-world walls are faded into view via the HMD, replacing the virtual environment in which the user expects to be immersed. Similarly, displaying the warnings too late may make it difficult for the user to react in time to avoid collisions. In some instances, users manually set obstacle boundaries based on user preferences, such as by drawing virtual boundaries that may be inset from real world obstacles (which can reduce immersion); some users may turn off warning systems rather than lose immersion. AR and VR systems may be untethered, which can enable users to have greater freedom of movement but may also increase the likelihood of collisions.

Users may operate the AR and VR systems differently depending on a pose in which the user is positioned at various points in time. For example, users may make movements of lesser magnitude when sitting or lying down as compared to standing up. Factors such as immersion and timely presentation of warnings can be affected by the pose in which the user is positioned and the corresponding behavior of or movements performed by the user while in the pose. Systems and methods in accordance with certain aspects of the present solution can use the sensor data corresponding to positions, orientations, and movement of the head, hands, or any combination thereof, to modify how warnings are generated using this information, which can facilitate displaying warnings under appropriate conditions while avoiding immersion loss. The sensor data may be classified into a type of the pose of the user, which can facilitate determining how to generate or modify the warnings. Sensor data such as accelerometer data, gyroscope data, camera data, or any combination thereof, may be directly used to determine the type of the pose, or may be processed through various portions of a pose estimation (e.g., positional tracking) pipeline, such as through a hand tracker associated with a controller manipulated by a hand of the user or a head tracker associated with a head device (e.g., HMD, HWD) on the head of the user. Various such systems and methods can use skeletal inference models to accurately determine an expected skeletal pose of the user (e.g., using reference points corresponding to the head and one or more hands of the user), and provide the expected skeletal pose to one or more machine learning models trained to categorize the expected skeletal pose into one or more types of poses.

In some embodiments, the system can include processing circuitry configured to receive sensor data regarding a user operating a head mounted display (HMD), identify a plurality of reference points of a pose of the user based at least on the sensor data, apply one or more models to the plurality of reference points to determine a type of the pose of the user, and select a mode of operation of the HMD responsive to the type of the pose.

The system can use a machine learning model trained to generate a prediction of the user's modality or position. The machine learning model can be trained using information from a skeletal inference model. The skeletal inference model can use position data from the headset and hand controllers to infer a skeletal pose of the user, and thus the corresponding modality. For example, the skeletal inference model can use statistical relationships regarding distances between the hands and head to infer the skeletal pose. The skeletal inference model can map the position data to expected skeletal poses. The position data can include six degree of freedom transform data from the headset and controllers. The machine learning model can also be trained using training data based on motion capture data to which virtual headsets and controllers are affixed. The machine learning model can maintain state information, which can be used to increase confidence in the detected modality. Because the machine learning model can operate as a black box, the model can take into account any of a variety of motion data parameters, such as position, velocity, acceleration, as well as time-averaged values of such parameters over time, to perform modality detection.

When in use, the machine learning model can use position data from the headset and controllers and the skeletal inference model to predict the modality. The system can calibrate to specific users using a body model that generates confidence over time regarding the user's positioning (e.g., height, reach, etc.). The system can detect transitions between modalities, which can enable more effective triggering of changes of how the guardian operates. For example, the machine learning model can be trained using training data that identifies modality transitions (e.g., when a user moves from standing up to sitting down), and thus in operation output an indication of a modality transition.

The system can modify how the warning generation operates based on the detected modality. For example, the system can decrease the sensitivity or obtrusiveness of the guardian as the user moves into less active modalities, such as to decrease the distance threshold from obstacles at which to trigger the guardian when the user is lying down, or change how the warning is used to warn about objects in the periphery of the user's field of view or behind the user. The system can modify a region of the user's field of view that the guardian occupies depending on the modality, such as to expand the guardian if the user is standing up.

Referring now to FIG. 1, a system 100 can include a plurality of sensors 104a . . . n, processing circuitry 116, and one or more displays 172. The system 100 can be implemented using the HMD system 200 described with reference to FIG. 2. The system 100 can be implemented using the computing environment described with reference to FIG. 4. The system 100 can incorporate features of and be used to implement features of AR and VR systems. At least some of the processing circuitry 116 can be implemented using a graphics processing unit (GPU). The functions of the processing circuitry 116 can be executed in a distributed manner using a plurality of processing units.

The processing circuitry 116 may include one or more circuits, processors, and/or hardware components. The processing circuitry 116 may implement any logic, functions or instructions to perform any of the operations described herein. The processing circuitry 116 can include any type and form of executable instructions executable by any of the circuits, processors or hardware components. The executable instructions may be of any type including applications, programs, services, tasks, scripts, libraries processes and/or firmware. Any of the components of the processing circuitry 116 including but not limited to the image renderer 168, warning generator 160, obstacle tracker 140, object detector 136, motion detector 120, and collision detector 132 may be any combination or arrangement of hardware, circuitry and executable instructions to perform their respective functions and operations. At least some portions of the processing circuitry 116 can be used to implement image processing executed by the sensors 104.

The sensors 104a . . . n can be image capture devices or cameras, including video cameras. The sensors 104a . . . n may be cameras that generate images of relatively low quality (e.g., relatively low sharpness, resolution, or dynamic range), which can help reduce the SWAP of the system 100. For example, the sensors 104a . . . n can generate images having resolutions on the order of hundreds of pixels by hundreds of pixels. At the same time, the processes executed by the system 100 as described herein can be used to generate display images for presentation to a user that have desired quality characteristics, including depth characteristics.

The sensors 104a . . . n (generally referred herein as sensors 104) can include any type of one or more cameras. The cameras can be visible light cameras (e.g., color or black and white), infrared cameras, or combinations thereof. The sensors 104a . . . n can each include one or more lenses 108a . . . j generally referred herein as lens 108). In some embodiments, the sensor 104 can include a camera for each lens 108. In some embodiments, the sensor 104 include a single camera with multiple lenses 108a . . . j. In some embodiments, the sensor 104 can include multiple cameras, each with multiple lenses 108. The one or more cameras of the sensor 104 can be selected or designed to be a predetermined resolution and/or have a predetermined field of view. In some embodiments, the one or more cameras are selected and/or designed to have a resolution and field of view for detecting and tracking objects, such as in the field of view of a HMD. The one or more cameras may be used for multiple purposes, such as tracking objects in a scene or an environment captured by the image capture devices and performing the collision detection techniques described herein.

The one or more cameras of the sensor 104 and lens 108 may be mounted, integrated, incorporated or arranged on an HMD to correspond to a left-eye view of a user or wearer of the HMD and a right-eye view of the user or wearer. For example, an HMD may include a first camera with a first lens mounted forward-facing on the left side of the HMD corresponding to or near the left eye of the wearer and a second camera with a second lens mounted forward-facing on the right-side of the HMD corresponding to or near the right eye of the wearer. The left camera and right camera may form a front-facing pair of cameras providing for stereographic image capturing. In some embodiments, the HMD may have one or more additional cameras, such as a third camera between the first and second cameras an offers towards the top of the HMD and forming a triangular shape between the first, second and third cameras. This third camera may be used for triangulation techniques in performing the depth buffer generations techniques of the present solution, as well as for object tracking.

The system 100 can include a first sensor (e.g., image capture device) 104a that includes a first lens 108a, the first sensor 104a arranged to capture a first image 112a of a first view, and a second sensor 104b that includes a second lens 108b, the second sensor 104b arranged to capture a second image 112b of a second view. The first view and the second view may correspond to different perspectives, enabling depth information to be extracted from the first image 112a and second image 112b. For example, the first view may correspond to a left eye view, and the second view may correspond to a right eye view. The system 100 can include a third sensor 104c that includes a third lens 108c, the third sensor 104c arranged to capture a third image 112c of a third view. As described with reference to FIG. 2, the third view may correspond to a top view that is spaced from an axis between the first lens 108a and the second lens 108b, which can enable the system 100 to more effectively handle depth information that may be difficult to address with the first sensor 104a and second sensor 104b, such as edges (e.g., an edge of a table) that are substantially parallel to the axis between the first lens 108a and the second lens 108b.

Light of an image to be captured by the sensors 104a . . . n can be received through the one or more lenses 108a . . . j. The sensors 104a . . . n can include sensor circuitry, including but not limited to charge-coupled device (CCD) or complementary metal-oxide-semiconductor (CMOS) circuitry, which can detect the light received via the one or more lenses 108a . . . j and generate images 112a . . . k based on the received light. For example, the sensors 104a . . . n can use the sensor circuitry to generate the first image 112a corresponding to the first view and the second image 112b corresponding to the second view. The one or more sensors 104a . . . n can provide the images 112a . . . k to the processing circuitry 116. The one or more sensors 104a . . . n can provide the images 112a . . . k with a corresponding timestamp, which can facilitate synchronization of the images 112a . . . k when image processing is executed on the images 112a . . . k.

Figure 2:
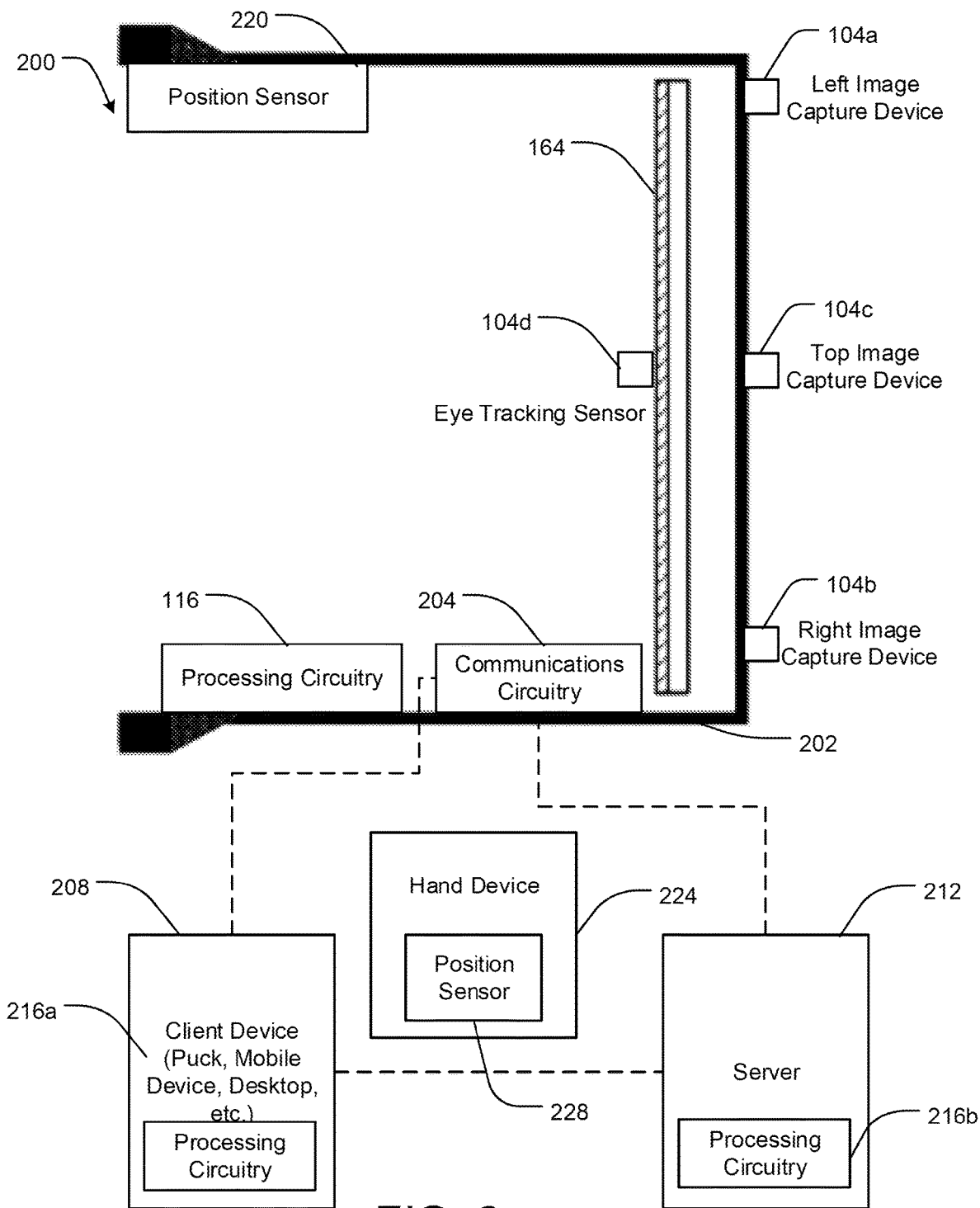
FIG. 2 is a schematic diagram of a head-mounted display (HMD) system according to an implementation of the present disclosure.

The sensors 104 can include eye tracking sensors 104 or head tracking sensors 104 that can provide information such as positions, orientations, or gaze directions of the eyes or head of the user (e.g., wearer) of an HMD. In some embodiments, the sensors 104 are inside out tracking cameras configured to provide images for head tracking operations. The sensors 104 can be eye tracking sensors 104 that provide eye tracking data, such as data corresponding to at least one of a position or an orientation of one or both eyes of the user. In some embodiments, the sensors 104 optically measure eye motion, such as by emitting light (e.g., infrared light) towards the eyes and detecting reflections of the emitted light. The sensors 104 can be oriented in a direction towards the eyes of the user (e.g., as compared to sensors 104 that capture images of an environment outside of the HMD). For example, the sensors 104 can include at least one fourth sensor 104d (e.g., as illustrated in FIG. 2) which can be oriented towards the eyes of the user to detect sensor data regarding the eyes of the user. In some embodiments, the head tracking sensors 104 generate motion data including at least one of a position, a velocity, or an acceleration of the head (e.g., of the HMD).

The sensors 104 can include hand tracking sensors 104 that can provide information such as positions or orientations of one or more hands of the user. The hand tracking sensors 104 can generate motion data including at least one of a position, a velocity, or an acceleration of a respective hand (e.g., of a hand device 224 manipulated by the hand as described with reference to FIG. 2). The head tracking sensors 104 and hand tracking sensors 104 can include any of a variety of position sensors, such as an inertial measurement unit (IMU), an accelerometer, a gyroscope, a magnetometer (e.g., magnetic compass), or any combination thereof. The sensors 104 can include various body position sensors such as leg sensors or torso sensors. The sensors 104 can track positon and movement with respect to gravity in some embodiments.

The sensors 104 can capture images 112 of an environment around the sensors 104. For example, the sensors 104 can capture images 112 of an environment in or around a field of view of the user of the HMD. The images 112 can be representations of the environment, such as color or grayscale array or matrix of pixels representing parameters of light captured from the environment (e.g., color, brightness, intensity). The environment can be an indoor or outdoor environment, including both natural and man-made structures, terrain, or other objects, including sky, clouds, roads, buildings, streets, pedestrians, or cyclists. The environment can include one or more objects (e.g., real-world objects), which can be represented by the images 112 captured by the sensors.

The processing circuitry 116 can include a motion detector 120. The motion detector 120 can include any function, operation, routine, logic, or instructions to perform functions such as detecting and monitoring movement of the head or hands of the user based on sensor data received from sensors 104. For example, the motion detector 120 can receive sensor data including at least one of a velocity or an acceleration (of the head or of one or more hands), and generate motion data based on the received sensor data. The motion detector 120 can generate motion data that includes at least one of a position or an orientation responsive to the sensor data. In some embodiments, the sensors 104 can at least partially implement the motion detector 120, such as to generate the motion data using processing hardware of the sensors 104 and provide the motion data to the processing circuitry 116.

The motion detector 120 can generate the motion data in a particular frame of reference. For example, the motion detector 120 can retrieve orientation data from the sensor data received from the sensors 104, and use the orientation data to transform the sensor data to a frame of reference used by simulation generator 164 to generate the virtual environment based on which image renderer 168 generates display images. The motion detector 120 can transform the sensor data to a frame of reference corresponding to at least one of the position or the orientation of the HMD, as the HMD may represent a baseline frame of reference corresponding to how the user perceives the simulated environment while using the HMD.

In some embodiments, the motion detector 120 includes a hand tracker 124. The hand tracker 124 can receive sensor data regarding one or more hands of the user from one or more corresponding hand tracking sensors 104, and generate motion data including at least one of a position, a velocity, or an acceleration of the one or more hands based on the received sensor data. For example, the hand tracker 124 can receive the sensor data from the hand tracking sensor 104 that is coupled with the hand device 224 to determine motion data indicative of motion of the hand device 224 (and thus the hand of the user). The hand tracker 124 can maintain a log of position, orientation, velocity, or acceleration data (or combinations thereof) to track the one or more hands of the user. The hand tracker 124 includes accelerometers, positons sensors, and/or velocity sensors in some embodiments.

In some embodiments, the motion detector 120 includes a head tracker 128. The head tracker 128 can receive sensor data regarding the head of the user from one or more corresponding head tracking sensors 104, and generate motion data including at least one of a position, a velocity, or an acceleration of the head based on the received sensor data. For example, the head tracker 128 can receive the sensor data from the head tracking sensor 104 that is coupled with the HMD to determine motion data indicative of motion of the HMD (and thus the head of the user). The head tracker 128 can maintain a log of position, orientation, velocity, or acceleration data (or combinations thereof) to track the head of the user. The head tracker 128 includes accelerometers, positons sensors, and/or velocity sensors in some embodiments.

The processing circuitry 116 can include a collision detector 132. The collision detector 132 can include any function, operation, routine, logic, or instructions to perform functions such as to determine distances to collision, times to collision, or likelihoods of collision of the user and one or more obstacles in the real world environment around the user. The collision detector 132 can use the motion data generated by the motion detector 120, along with information regarding obstacles provided by obstacle tracker 140, to determine information regarding potential collisions between the user and one or more obstacles. The collision detector 132 can generate an indication of a potential collision that includes parameters such as a distance to collision, a time to collision, or a likelihood of collision.

To determine the distance to collision, the collision detector 132 can determine, based on the motion data received from the motion detector 120, a position of the user, and compare the position of the user to the position of the one or more obstacles. The position of the user can include at least one of a position of the head of the user, a position of one or more hands of the user, or an interpolated position regarding the body of the user, which the collision detector 132 can determine by combining positions of the head and the hand(s), such as by retrieving a model of a body shape and registering the positions of the head and the hand(s) to the model. The collision detector 132 can determine the distance to collision by comparing the position of the user to the position of the one or more obstacles by subtracting the positions. In some embodiments, the user's body type, (e.g., height, weight, arm length, leg length, etc.) can be stored as part of a user profile and used by the collision detector 120.

In some embodiments, the collision detector 132 determines the position of the head by applying a minimum radius to the position of the head. This can facilitate defining the edge of the playspace (e.g., the virtual environment) up against the one or more obstacles, and avoid a situation in which the user's body contacts the one or more obstacles before the collision detector 132 determines the distance to collision to decrease to zero. In some embodiments, the minimum radius is greater than or equal to ten centimeters and less than or equal to fifty centimeters. In some embodiments, the minimum radius is greater than or equal to twenty centimeters and less than or equal to forty centimeters. In some embodiments, the minimum radius is greater than or equal to twenty five centimeters and less than or equal to thirty five centimeters. The minimum radius can be on an order of size similar to a width of the human body or a size of the HMD.

The collision detector 132 can determine the position of the one or hands by applying a minimum radius to the position of the one or more hands, which can similarly reduce the likelihood that the user's hands contact the one or more obstacles before the collision detector 132 determines the distance to collision to decrease to zero. The minimum radius applied to the position of the one or more hands can be less than that applied to the position of head.

In some embodiments, the collision detector 132 limits the position of the one or more hands based on the position of the head and a predetermined characteristic regarding reach of the one or more hands. For example, the collision detector 132 can compare a difference between the position of the one or more hands and the position of the head to an expected maximum distance, and modify the position of the one or more hands based on the expected maximum distance responsive to the difference being greater than the expected maximum distance (e.g., by determining an orientation vector of the one or more hands relative to the position of the head, and reducing the distance from the position of the one or more hands to the position of the head along the orientation vector to be no greater than the expected maximum distance). In some embodiments, the expected maximum distance corresponds to a model of the human body, such as a value indicative of a 95th percentile or 99th percentile extent of human reach. In some embodiments, the expected maximum distance is one meter.

The collision detector 132 can determine the maximum distance based on a user profile regarding the user. For example, the user profile may include user profile data regarding the user such as height, reach, or target warning display rates. The processing circuitry 116 can request the user profile data via a user interface of the HMD or VR system (e.g., via an application operated by the processing circuitry 116). The processing circuitry 116 monitor usage of the HMD or VR system to detect the user profile data, such as by using position sensors 104 or the motion detector 120 to detect range of movement of the user. In some embodiments, the processing circuitry 116 requests or detects the user profile data responsive to an initialization process of the HMD or VR system (or one or more applications operated by the HMD or VR system), such as by providing instructions via the HMD or VR system requesting the user to perform movements such as reaching movements.

The collision detector 132 can use the distance to collision and at least one of velocity data or acceleration data of the motion data to determine the time to collision. For example, the collision detector 132 can divide the distance to collision by velocity to determine the time to collision.

In some embodiments, the collision detector 132 smoothes the motion data over a predetermined duration of time. By smoothing the motion data (e.g., smoothing velocity or acceleration data), the collision detector 132 can reduce the likelihood of triggering false positive warnings by the warning generator 160, which might otherwise result from short, rapid, or impulse-like movements, such as fast flicks of the hand device 224. The collision detector 132 can determine an average value of the motion data over the predetermined duration of time, and can use the average value to determine the time to collision. In some embodiments, the predetermined duration of time is less than one second. In some embodiments, the predetermined duration of time is greater than or equal to 0.05 seconds and less than or equal to 0.50 seconds. In some embodiments, the predetermined duration of time is greater than or equal to 0.1 seconds and less than or equal to 0.3 seconds. In some embodiments, the predetermined duration of time is 0.15 seconds. The collision detector 132 can smooth the motion data by sampling motion data over the predetermined duration of time backwards from a current time at which the collision detector 132 processes the motion data (e.g., sampling the previous 0.15 seconds of motion data). In some instances, smoothing the motion data may introduce latency; however, the latency effects can be mitigated or offset by increasing estimation time (e.g., time over which collision detection or warning generation occurs or rate at which collision detection occurs).

The collision detector 132 can determine the likelihood of collision using parameters such as the distance to collision, the time of collision, and the motion data. For example, the collision detector 132 can generate a relatively greater (or lesser) likelihood of collision as the distance to collision or time of collision decreases (or increases). The collision detector 132 can generate a relatively greater (or lesser) likelihood of collision depending on a direction of the velocity or acceleration; for example, if the velocity indicates that the user is moving towards (or away) from the one or more obstacles, or the acceleration indicates a rate of movement towards the one or more obstacles is increasing (or decreasing), then the likelihood of collision can be relatively greater (or lesser). The collision detector 132 can detect potential collisions responsive to various trigger conditions, such as on a schedule or periodic basis (e.g., detect potential collisions every 10 milliseconds), or responsive to detecting at least a threshold amount of movement of the user (e.g., moving more than 1 meter; moving at more than 0.5 meters per second). For example, the potential collisions can be detected by comparing positions, directions of movement, or rates of movement (e.g., velocities, accelerations) of the user to the locations of the one or more obstacles.

In some embodiments, the collision detector 132 provides the velocity data as the collision data. For example, as described further herein, the warning generator 160 can compare the velocity data to a velocity threshold, and generate a warning responsive to the velocity data exceeding the velocity threshold.

The processing circuitry 116 can include an object detector 136. The object detector 136 can include any function, operation, routine, logic, or instructions to perform functions such as detecting obstacles and positions or movement thereof in the real world environment. The object detector 136 can receive the images 112 from the sensors 104. The object detector 136 can process the images 112 or portions thereof to detect one or more objects represented by the images 112. For example, the object detector 136 can detect or identify objects represented by the images 112 by processing elements of the images 112 such as pixels or groups of pixels, such as by processing pixels or groups of pixels indicating colors, shapes, edges, contrast between pixels or groups of pixels, and spatial relationships between pixels. The object detector 136 can detect objects by executing spatial filters, segmentation, or machine learning models trained to detect objects. The object detector 136 can identify candidate objects from the image 112, such as groups of pixels representing edges, compare the candidate objects to one or more template objects (e.g., template objects or features thereof in an object database), and identify the objects of the image 112 based on candidate objects that match template objects. The object detector 136 can apply various objection recognition algorithms or models to identify the objects. The objects can be real-world or simulated objects.

In some embodiments, the object detector 136 does not specifically identify a type, class, or other identifier of the object in the image 112. The object detector 136 can receive an indication from the sensors 104 that the object has been detected by the sensors 104. For example, the object detector 136 can receive an indication that a particular image 112 represents an object (in which case the object detector 136 can process the image 112 to identify one or more pixels corresponding to the object). In some embodiments, the indication can include one or more pixels corresponding to the object.

In some embodiments, the object detector 136 detects the object using an object database that can include location data of various objects, buildings, structures, roads, or other indoor and outdoor features. For example, the object detector 136 can communicate with an object database mapping objects or features of objects to position data. The object database may also maintain semantic or textual information regarding objects, such as information regarding type, class, shape, color, size, or other features regarding the objects. The object detector 136 can receive data regarding the position of the HMD or VR system (e.g., from position sensor 220 described with reference to FIG. 2), and use the data to retrieve one or more candidate objects from the object database. The object detector 136 can compare the sensor data to the one or more candidate objects and information maintained by the object database regarding the one or more candidate objects to identify the object (e.g., by matching the sensor data to the information received from the object database). In some embodiments, the object database includes data from the database of obstacles described with reference to obstacle tracker 140, and the object detector 136 can use the detected objects to update the locations of obstacles in the database of obstacles.

The object detector 136 can determine a position of the object using information received from the sensors 104, such as the image 112 or the indication that the image 112 represents an object. For example, the object detector 136 can identify one or more pixels corresponding to the object. In some embodiments, the object detector 136 determines the position of the object as a position in an image space of the image 112, such as by assigning one or more pixels corresponding to the object as the position of the object. In some embodiments, the object detector 136 determines the position of the object as a position in three-dimensional space (e.g., real world space, AR or VR space, space in the environment around the HMD or VR system), such as by using depth information to determine the position of the object.

The processing circuitry 116 can include an obstacle tracker 140. The obstacle tracker 140 can include any function, operation, routine, logic, or instructions to perform functions such as tracking the positions and motion of the one or more obstacles. In some embodiments, the obstacle tracker 140 maintains a database of obstacles and locations associated with the obstacles. In some embodiments, the obstacle tracker 140 receives obstacle position data from the object detector 136.

In some embodiments, the obstacle tracker 140 maintains a database regarding obstacles in the play space. The database can be generated based on user input indicating obstacle locations, such as user input provided via manipulation of the hand device 224 (e.g., drawing of walls, doors, floors, ceilings, or objects in the play space). The obstacle tracker 140 can request data regarding the obstacles, such as by providing instructions to the user requesting the user to operate a hand device (e.g., handheld controller) associated with the HMD to indicate boundaries corresponding to the one or more obstacles. The obstacles can be registered to a frame of reference corresponding to an orientation of the HMD in which the obstacles are identified, such that the obstacles can subsequently be retrieved in the frame of reference and transformed to a different frame of reference as the orientation of the HMD changes. The locations of the one or more obstacles can be detected relative to a position of the user, such as a position that can be determined based on at least one of position data from a position sensor of the HMD or position data from a position sensor of one or more hand devices. The locations of the one or more obstacles can be detected by adjusting locations of the one or more obstacles as maintained in the obstacle database (or as determined via depth mapping) based on at least one of a position or an orientation of the user. For example, the at least one of the position or the orientation of the user can be periodically sampled (e.g., based on sensor data from position sensors of the VR system, thus taking into account movement of the user) and compared to the frame of reference of the locations of the one or more obstacles to determine the locations of obstacles relative to the user.

The obstacle tracker 140 can include a depth mapper 144. The depth mapper 144 can include any function, operation, routine, logic, or instructions to perform functions such as generating depth information regarding the one or more obstacles tracked by the obstacle tracker 140. The depth mapper 144 can receive the images 112 from the sensors 104, and use the images 112 to generate depth information regarding one or more obstacles in the environment, such as depth maps (e.g., depth buffers). The depth mapper 144 can generate the depth information based on information regarding the image capture devices 104$a$ . . . $n$ used to capture the images 112$a$ . . . $k$. For example, the depth mapper 144 can the depth map based on a baseline distance between the first lens 108$a$ via which the first image 112$a$ was captured and the second lens 108$b$ via which the second image 112$b$ was captured, and a focal length of the first lens 108$a$. The depth mapper 144 can generate a first depth map by assigning a depth value to at least one corresponding pixel of the first image 112$a$, and a second depth map by assigning a depth value to at least one corresponding pixel of the second image 112$b$. For example, the depth mapper 144 can generate the first depth map as a matrix of pixels corresponding to the pixels of the first image 112$a$, each first depth buffer pixel having an assigned depth value. The depth mapper 144 can generate the depth map to have a lesser resolution than the images 112$a$ . . . $k$.

The processing circuitry 116 can include a pose detector 148. The pose detector 148 can include any function, operation, routine, logic, or instructions to perform functions such as detecting a pose that the user is oriented in responsive to sensor data from the sensors 104, motion data from the motion detector 120, or various combinations thereof. For example, the pose detector 148 can receive the sensor data from position sensors (e.g., accelerometer data, gyroscope data, camera data, head tracking position sensor 220, hand tracking position sensor 228 described with reference to FIG. 2, or any combination thereof), including receiving the sensor data as motion data from the motion detector 120. As such, the pose detector 148 can detect the pose of the user using data from various stages of processing by the system 100, including using accelerometer data (e.g., position, velocity, or acceleration data), gyroscope data (e.g., angular data, orientation data), or camera data (e.g., image data) that may or may not be processed by the motion detector 120, hand tracker 124, or head tracker 128. The sensor data can include six degree of freedom (DOF) transform data from any of the sensors or trackers. The pose detector 148 can use the received data to categorize the pose of the user based on a set of types (e.g., modalities), such as standing, sitting, or lying down. For example, the pose detector 148 can determine the pose to indicate various aspects of how the user is oriented, such as distance of head or hands from each other, the ground, or other landmarks, angles of hands relative to various planes of the body, or orientation of the head, and can use this information to assign a type to the pose, which may be a particular type of a predetermined set of types. The pose detector 148 can provide an indication of the type of the pose to warning generator 160, which, as described below, can cause the warning generator 160 to modify how the warning generator 160 operates based on the detected type.

The pose detector 148 can determine the pose by using position or movement information indicated by the sensor data to identify features of various poses that the sensor data may correspond to. For example, the pose detector 148 can identify positions of hands of the user from the sensor data (e.g., from sensor 228 or information provided by hand tracker 124), and compare the identified positions of the hands to any of a variety of templates or models of poses to identify a pose that the user is positioned in. The pose detector 148 can periodically sample the sensor data (e.g., receive the sensor data as it is outputted by the sensors or trackers or request the sensor data less frequently than it is outputted). The pose detector 148 can time-average sensor data over various periods of time.

The pose detector 148 can identify reference points of the pose of the user based at least on the sensor data. The pose detector 148 can process the sensor data to determine the reference points, such as positions or orientations of the head received from head tracker 128 or position sensor 220 and hands indicated by hand tracker 124 or sensors 228. The pose detector 148 can maintain a reference point data structure that includes data such as a position and orientation of the head and each hand at one or more points in time, and can update the reference point data structure responsive to receiving the sensor data.

The pose detector 148 can use the reference points of the pose to determine the pose. For example, the pose detector 148 can compare the reference points to corresponding reference points of one or more templates of respective poses, determine a match score from the comparison, and determine the pose based on the match score satisfying a match condition, such as the match score being greater than a threshold match score or being a highest match score.

The pose detector 148 can include one or more pose models 152 that can be used to determine the pose of the user and to categorize the pose of the user as one of various types of poses. The one or more pose models 152 can include the templates of respective poses, and can receive the reference points as input and output the pose responsive to receiving the reference points. In some embodiments, the pose detector 148 assigns a confidence score to each of several candidate types of poses, and selects at least one type of pose as the detected type of pose using the confidence scores (e.g., a type of pose corresponding to a highest confidence score or one or more types of poses satisfying a threshold confidence score). In some embodiments, the user's body type (e.g., height, weight, arm length, leg length, etc.) can be stored as part of a user profile and used by the pose detector 148.

The pose models 152 can include one or more skeletal inference models 152. The skeletal inference model 152 can receive the reference points as input and output an expected skeletal pose of the user. The pose detector 148 can categorize the type of the pose of the user using the expected skeletal pose, or can further process the expected skeletal pose (e.g., using templates or other models 152) to determine the pose which can then be categorized.

The skeletal inference model 152 can include parameters such as height, reach, limb lengths, and distances between the head and hands in different poses or arrangements to infer the skeletal pose. The skeletal inference model 152 can use the sensor data to evaluate the parameters in order to infer the skeletal pose. The skeletal inference model 152 can include a statistical or probabilistic model that assigns a confidence score to each of a variety of expected skeletal poses using the sensor data (e.g., using positions or orientations of the head and hands as well as parameters that are determined based on the sensor data, such as distances between the hands or between each hand and the head). The skeletal inference model 152 can determine statistical relationships regarding distances between the hands and head to infer the expected skeletal pose. For example, the skeletal inference model 152 can determine a confidence score that the expected skeletal pose is a pose in which the user is lying down based on an expected orientation of the head of the user or distance between the head of the user and the hands of the user in the lying down pose. The skeletal inference model 152 can use sensor data over time to update the expected skeletal pose, such as to increase or decrease confidence scores assigned to various poses as additional sensor data is received.

The pose models 152 can include a body model 152. The body model 152 can use the sensor data to generate data regarding expected parameters regarding the user, such as height or reach. The pose detector 148 can provide the sensor data to the body model 152 to update the body model 152, which can enable the body model 152 to increase the accuracy of and confidence in the expected parameters. For example, as head position data is received and processed, the body model 152 can update an expected height of the user (e.g., based on the expected height being related to a maximum distance of the position sensor 220 relative to a ground reference height, which may account for transient increases in the maximum distance that reflect the user jumping). The body model 152 can provide the expected parameters to various other models 152, including the skeletal inference model 152, for the models 152 to use in determining the pose of the user. The pose detector 148 can use the body model 152 to calibrate pose detection for each particular user, such as by maintaining body models 152 assigned to respective users.

The processing circuitry 116 can update, maintain, and selectively allow or prevent access to transmission of data associated with a user, including but not limited to physiological data, body model data, skeletal data, pose data, eye tracking data, user profile data, or various data associated with models 152. For example, the processing circuitry 116 may use as inputs, personal or biometric information of the user for pose detection, warning generation, user-authentication, or experience-personalization purposes. A user may opt to make use of these functionalities, such as to enhance their experience using the system 100 or various devices associated with or in communication with one or more components of the system 100. As an example, a user may provide personal or biometric information to the system 100, such as for use by the body model 152. The user's privacy settings may specify that such information may be used only for particular processes, such as authentication, and further specify that such information may not be shared with any third-party system or used for other processes or applications associated with the system 100 (or another system in communication with the system 100, such as a social network). The user's privacy setting may specify that data received or detected by the system 100, such as images, sensor data, eye tracking data, biometric data, or pose data, may be used only for a limited purpose (e.g., authentication, operation of selected component(s) of the system 100), and further specify that such data may not be shared with any third-party system or used by other processes or applications associated with the system 100 or devices in communication with the system 100. The user's privacy setting may specify that the system 100 does not perform operations to detect (or store, or transmit) particular data, such as pose data, unless the system 100 identifies that the privacy setting indicates permission to detect (or store, or transmit) the data.

The pose detector 148 can determine the type of the pose using the determined pose, including by using the expected skeletal pose determined by the skeletal inference model 152. For example, the pose detector 148 can maintain a mapping of poses to types of poses. There may be multiple poses mapped to a particular pose; for example, the pose detector 148 can determine various poses in which the arms of the user are oriented in various locations, each of which correspond to the type of the pose being a sitting type.

The pose detector 148 can include one or more machine learning models 152 that determine the type of the pose. The pose detector 148 can apply the reference points to the machine learning model 152 to determine the type of the pose. The machine learning model 152 can receive, as input, the sensor data (e.g., position data, orientation data, motion data), the reference points, the expected pose determined by the skeletal inference model 152, the body model 152, or any combination thereof, and determine the type of the pose responsive to receiving the input.

The machine learning model 152 can include any of various unsupervised models (e.g., clustering algorithms, unsupervised neural networks) or supervised models (e.g., support vector machines, regression models, supervised neural networks, decision trees), which can be trained to predict the type of the pose. The machine learning model 152 can be trained remotely from the system 100, and the processing circuitry 116 can receive the trained machine learning models 152 (or various parameters that can be used to initialize the trained machine learning models, such as weights and biases of a neural network) after the machine learning model 152 is trained. The pose detector 148 can provide the sensor data to the machine learning model 152 to update the machine learning model 152. In some embodiments, the machine learning model 152 maintains state information (e.g., detected types of poses at previous points in time), which the machine learning model 152 can use to determine or update the type of the pose at a current point in time.

The unsupervised model 152 can cluster training data including sensor data, reference points, expected skeletal poses, or combinations thereof into clusters corresponding to types of poses (e.g., even if the training data has not been labeled with the type of the pose corresponding to each training data sample).

The supervised model 152 can be trained using training data that includes sensor data, reference points, expected skeletal poses, or combinations thereof, which are labeled with the corresponding type of the pose. For example, a training data sample may include a group of reference points and an indication that the training data sample is a sitting down type of pose. A training data sample may include an expected skeletal pose (which may indicate parameters such as relative distances of and orientations between the head and hands) and an indication that the training data sample is a standing type of pose.

The processing circuitry 116 or other processing hardware remote from the processing circuitry 116 can apply the training data as input to the supervised model 152, cause the supervised model 152 to generate a candidate output responsive to the training data, compare the candidate output to known output (e.g., the types of poses assigned to corresponding training data samples), and update the supervised model 152 based on the comparison (e.g., update weights, biases, coefficients, or other parameters of the supervised model 152 that operate on the input to generate the output). The updating can be performed iteratively to cause the supervised model 152 to satisfy a training condition, such as a threshold number of iterations or a threshold difference between the candidate output and the known output.

In some embodiments, the supervised model 152 is trained using motion capture data, such as training data samples generated from motion capture data. For example, the motion capture data may be generated based on image data regarding various users positioned in or moving through various poses, which may be labeled with the type of the pose. Virtual trackers corresponding to headsets (e.g., head trackers) and controllers (e.g., hand trackers) may be assigned to corresponding locations in the image data. The virtual trackers may be assigned automatically, such as by operating one or more image recognition algorithms on the image data to identify locations of head and hand features and assigning the virtual trackers to one or more pixels corresponding to the identified locations. The virtual trackers may be assigned responsive to user input indicating portions of the image data to which to assign the virtual trackers. The training data samples generated from the motion capture data may thus include locations of head trackers and hand trackers in various poses that have been labeled with the corresponding pose. The training data samples may also be labeled with the type of the pose.

As noted above, the pose detector 148 can apply as input to the trained machine learning model 152 sensor data, reference points, expected skeletal poses generated by the skeletal inference model 152, body model data generated by the body model 152, or various combinations thereof. Responsive to receiving the input, the machine learning model 152 can generate an output indicating the type of the pose of the user that the machine learning model 152 determines from the input.

The pose detector 148 can detect a transition between types of poses, such as if a user shifts from a sitting down pose to a standing up pose. For example, the pose detector 148 can detect the transition responsive to detecting a change in the determined type of pose outputted by the pose models 152. The pose detector 148 can periodically determine the type of the pose, and output an indication that the pose has changed (which may include the new type of pose) responsive to detecting the change in the determined type of pose. The pose detector 148 can maintain confidence scores associated with at least a subset of the types of poses, and detect the change in the type of pose responsive to a change in the type of pose having a highest confidence score or a confidence score satisfying a minimum confidence threshold. For example, as a user moves from a sitting pose to a standing up pose, the confidence score associated with the sitting pose that the pose detector 148 generates (e.g., by providing sensor data as input to pose models 152) may decrease, while the confidence score associated with the standing up pose that the pose detector 148 generates may increase, and the pose detector 148 can detect the transition from the sitting down pose to the standing up pose responsive to the confidence score associated with the standing up pose satisfying the minimum confidence threshold and being greater than the confidence score associated with the sitting down pose.

In some embodiments, the pose detector 148 selectively outputs the type of the pose based on detecting the transition between types of poses. For example, the pose detector 148 may periodically monitor the type of the pose, output the type of the pose responsive to detecting the transition, and not output the type of the pose or output the type of the pose at a decreased output rate responsive to not detecting the transition. As such, the pose detector 148 can reduce computational burdens associated with downstream components that may update how they operate responsive to the detected pose.

The processing circuitry 116 can use the determined type of the pose to select a mode of operation of the system 100, the HMD 200, or various components or processes thereof. For example, the processing circuitry 116 can modify frame rates, rates of processes performed by simulation generator 164 or image renderer 168, image data generated by simulation generator 164 or image renderer 168, computational capacity or memory assigned to perform processes, responsive to the type of the pose. As described below, the processing circuitry 116 can modify operation of warning generator 160 using the type of the pose, such as to control thresholds based on which the warning generator 160 generates warnings or display data that the warning generator 160 generates responsive to the type of the pose.

The processing circuitry 116 can include a warning generator 160. The warning generator 160 can include any function, operation, routine, logic, or instructions to perform functions such as generating a warning regarding a potential collision with the one or more obstacles in response to the motion data and the collision data received from the collision detector 132 or the type of the pose of the user received from the pose detector 148. For example, the warning generator 160 can selectively generate icons, labels, or representations of the one or more obstacles to warn the user of the HMD of the potential collision. For example, the warning generator 160 can generate display data indicating gridded elements representing the one or more obstacles (e.g., gridded walls). The warning generator 160 can generate the warning to correspond to a real-world position of the one or more obstacles relative to a direction of movement of the user.

The warning generator 160 can generate the warning by evaluating various combinations of factors. For example, the warning generator 160 can generate no warning when the user is far from the obstacles even if the motion data indicates that the user is moving relatively quickly; generate at least a minimal warning when the user is close to the obstacles even if the motion data indicates that the user is not moving or the type of the pose indicates that the user is sitting down or lying down.

In some embodiments, the warning generator 160 determines one or more parameters of the warning (e.g., a parameter of how the warning is to be displayed) based on the collision data. For example, the warning generator 160 can apply a warning policy based on various filters, functions, thresholds, or other processes to the collision data to determine if and how to display the warning. The one or more parameters can include magnitude (e.g., brightness, intensity), position, contrast, color, frequency, or intermittency. For example, the warning generator 160 can apply a function to the time to collision received from the collision detector 132 to determine an intensity of the warning based on the time to collision, such as a function that increases the intensity as the time to collision decreases.

In some embodiments, the warning generator 160 uses thresholds regarding the collision data to determine when and how to trigger and generate warnings based on the collision data. For example, the warning generator 160 can compare the distance to collision to a threshold distance, and generate the warning responsive to the distance being less than the threshold distance. The warning generator 160 can compare the time to collision to a threshold time, and generate the warning responsive to the time to collision being less than the threshold time. The warning generator 160 can compare the likelihood of collision to a threshold likelihood of collision, and generate the warning responsive to the likelihood of collision being greater than the threshold likelihood of collision. The thresholds can be predetermined, user-defined, or adjusted responsive to various scaling factors described herein.

The warning generator 160 can determine or update the thresholds based at least on the type of the pose of the user received from the pose detector 148. The warning generator 160 can maintain various functions, policies, lookup tables, or mappings that relate the type of the pose of the user to corresponding thresholds. The warning generator 160 can determine the thresholds based on factors such as whether the type of the pose indicates that the user may be moving relatively quickly or slowly. For example, the warning generator 160 can modify the thresholds to decrease the sensitivity or obtrusiveness of the warnings as the user moves into less active modalities (e.g., less active types of poses, such as lying down or sitting as compared to standing up or moving while standing), such as to decrease a threshold at which to trigger generation and output of the warning when the user is lying down, or change how the warning is used to warn about objects in the periphery of the user's field of view or behind the user.

In some embodiments, the warning generator 160 determines (or updates) the thresholds responsive to receiving the type of the pose of the user. For example, the warning generator 160 can receive the type of the pose of the user from the pose detector 148, generate one or more preliminary thresholds, and update the one or more preliminary thresholds using the type of the pose (e.g., increase the distance threshold if the user is determined to be standing up, decrease the distance threshold if the user is determined to be sitting down). In some embodiments, the warning generator 160 determines the thresholds responsive to a change in the type of the pose of the user. For example, the warning generator 160 can determine the thresholds at a first instance using the type of the pose of the user, monitor the type of the pose of the user (or wait for an updated type of the pose of the user if the pose detector 148 selectively outputs the type of the pose of the user responsive to the change in the type of the pose), and update the thresholds at a second instance responsive to detecting that the type of the pose of the user changes at the second instance.

In some embodiments, the warning generator 160 assigns a greater weight to motion data regarding the head of the user than motion data regarding the one or more hands of the user. For example, the warning generator 160 can assign a first weight to motion data regarding the head of the user that is greater than a second weight assigned to motion data regarding the one or more hands of the user. The greater weight for the motion data regarding the head of the user can help balance maintaining immersion while providing appropriate warnings, as the head and hands may typically move at different weights, and the position of the head may more consistently represent the position of the user. The weights can be applied to increase the collision data (e.g., likelihood of collision) where the collision data is compared to a minimum threshold (e.g., minimum threshold above which the warning is to be generated), or to decrease the collision data (e.g., time to collision, distance to collision) where the collision data is compared to a maximum threshold (e.g., maximum threshold below which the warning is to be generated). The weights can be applied to adjust respective thresholds. The weights can be assigned to make the warning generator 160 less sensitive to motion of the one or more hands than motion of the head. The warning generator 160 can determine the weights based at least on the type of the pose of the user.

In some embodiments, the warning generator 160 applies different thresholds when evaluating the distance to collision regarding the head as compared to the distance to collision regarding the one or more hands. For example, the warning generator 160 may use a threshold that is lower for the distance to collision of the one or more hands than of the head, such that the one or more hands should be closer to the one or more obstacles than the head to trigger the warning.

In some embodiments, the warning generator 160 uses a minimum activation distance to trigger the warning based on movement regarding the head (e.g., regardless of velocity of the head). For example, the warning generator 160 can determine a distance that the head moves (e.g., during a previous period of time, such as the previous one second, two seconds, or three seconds), compare the distance to the minimum activation distance, and not generate the warning unless the distance exceeds the minimum activation distance. This can be useful for instances in which a user may make sudden but short movements. In some embodiments, the minimum activation distance is greater in a direction behind the HMD than in front of the user, which can account for factors such as the head of the user slouching forward (such that the point at which the position of the head is detected is closer to the front of the head of the user than the back of the head of the user).

The warning generator 160 can generate a minimum warning indicator independent of the thresholds, or responsive to at least one threshold being satisfied. For example, if the motion detector 120 provides motion data indicating that the user is not moving or the pose detector 148 indicates that the type of the pose of the user is one in which the user is not moving or has a limited range of motion (e.g., lying down), the warning generator 160 can provide a minimum indicator (e.g., around the HMD or hand device 224). This can enable the warning generator 160 to avoid loss of immersion while maintaining the warning.

The warning generator 160 can scale the collision data or the one or more parameters based on various scaling factors. For example, the warning generator 160 can use scaling factors such as a size metric of the play space or the environment, a motion metric regarding one or more prior movements performed by the user, the application being used by the simulation generator 164 to generate the virtual environment, or a user model or user profile.

For example, the warning generator 160 can determine a size metric of the play space (e.g., the real world environment, such as the room, in which the user is operating the HMD). The warning generator 160 can determine the size metric based on boundaries maintained by the obstacle tracker 140 regarding the one or more obstacles, including obstacles such as walls, floors, and ceilings. The warning generator 160 can decrease the effect of velocity or acceleration data as the size metric decreases (e.g., in smaller spaces the user may be more aware of their surroundings) and increase the effect of velocity or acceleration data as the size metric increases (e.g., in larger spaces the user may be less aware of their surroundings and may make larger motions). For example, the warning generator 160 can assign a greater weight to velocity or acceleration data as the size metric increases.

The warning generator 160 can determine a motion metric regarding recent motion performed by the user. For example the warning generator 160 can monitor velocity data during a previous period of time (e.g., previous one second, previous two seconds, previous three seconds), and compare the velocity data to a velocity threshold. Responsive to an instantaneous or smoothed value of the velocity data exceeding the velocity threshold, the warning generator 160 can determine that the user is performing relatively large movements, and increase the sensitivity of the warning generator 160 for generating warnings (e.g., decrease threshold(s) used to evaluate velocity data). For example, if the warning generator 160 detects large increases in velocity during the previous period of time, the warning generator 160 decrease a velocity threshold used to evaluate the velocity data, or distance thresholds or time to collision thresholds used to evaluate distance to collision or time to collision data. In some embodiments, the warning generator 160 assigns a greater weight to motion data regarding the head than motion data regarding the one or more hands when determining the motion metric.

The warning generator 160 can adjust the thresholds used to evaluate the collision data based on an application being operated to generate the virtual environment. For example, the application may indicate application data regarding expected movements to be performed in use of the application. The application data may be based on historical data regarding use of the application by any number of users; for example, the simulation generator 164 can use the motion detector 120 to monitor motion data during usage of the application and maintain a log of the motion data, which can be used to determine statistical measures of the motion data (e.g., average velocity, median velocity, standard deviations of velocity, or similar measures for acceleration).

In some embodiments, the application data indicates an average velocity of expected movements. The warning generator 160 can determine the thresholds used to evaluate the collision data based on the average velocity, such as by applying a scaling factor to the average velocity (e.g., set the threshold to two times the average velocity), or configuring the thresholds so that the warning is triggered when a time to collision based on the average velocity and an actual distance to the one or more obstacles is less than a threshold time (e.g., if the user moving at the average velocity from a current position for two seconds would contact the one or more obstacles, then trigger the warning).

In some embodiments, the application data indicates a velocity ranking for the application. For example, the warning generator 160 may use a plurality of velocity rankings that the warning generator 160 can map to expected average velocity or to particular thresholds. The velocity ranking may be user defined; for example, a developer of the application can assign the velocity ranking to the application.

The warning generator 160 can maintain a user model regarding triggering warnings for a particular user of the HMD. The warning generator 160 can identify a user identifier of the user (e.g., based on various activation, initialization, or login procedures performed by the user), and map the user model to the user identifier. The user model can enable the warning generator 160 to customize the triggering of warnings for the identified user. For example, the warning generator 160 can use the user model to customize the warnings based on factors such as the application being operated, including the application data described above, as well as an indication of a frequency or a magnitude of warnings that are triggered by movement of the identified user, which can enable the warning generator 160 to maintain a balance between immersion and warning.

The processing circuitry 116 can operate a user model to determine how to generate warnings. The user model can include any of various unsupervised or supervised machine learning models, which can be trained to output factors associated with warning generation such as thresholds associated with triggering warnings and parameters of the warnings. For example, the user model can include an unsupervised machine learning model that is trained using the collision data to segment or cluster the collision data (e.g., along with detected collision events) to identify thresholds for triggering warnings. The user model can be trained using data regarding the user as well as other users. The user model can include a supervised machine learning model that is trained using the collision data to generate the thresholds based on the collision data and an indication of when collisions occur, an indication of when users deactivate the warning system (which may be indicative of loss of immersion), or a target performance characteristic, such as a ratio of displayed images that include warnings (e.g., include display data regarding the warnings of more than a threshold number of pixels or intensity of pixels) to displayed images that do not include warnings. In some embodiments, the warning generator 160 maintains a data structure that indicates at least one of the application being operated, the motion data detect during operation of the application, the time stamps at which the warning generator 160 triggers warnings, the collision data corresponding to the time stamps at which the warning generator 160 triggers warnings, or the thresholds used to trigger the warnings. The warning generator 160 can provide entries of the data structure as input to the user model to train the user model. For example, the warning generator 160 can cause the user model to cluster the input of the data structures based on particular thresholds in order to achieve a target balance between immersion and warning (e.g., achieve a particular frequency of warning based on displayed images in which the warning is present compared to total displayed images).

In some embodiments, the warning generator 160 selectively generates the warning in an image space of the HMD. For example, the warning generator 160 can generate the warning so that the warning is more noticeable in a periphery of displays 172 or a periphery of the field of view (FOV) of displays 172, or so that the warning is focused on the portion(s) of the one or more obstacles that trigger the warning generator 160 to generate the warning. For example, the warning generator 160 can identify the periphery to correspond to edges (or edge portions) of the images displayed using the displays 172. The periphery can correspond to a number of pixels from the edges or a fraction of pixels from the edges to the center of the images displayed using the displays 172. The periphery can include horizontal edges, vertical edges, or any combination thereof, including particular edges portions where the displays 172 have curved or curvilinear edges. As such, the warning generator 160 can limit a degree to which the warning detracts from immersion, highlight the one or more obstacles that trigger the warning, and enable the warning to have directionality.

The warning generator 160 can selectively generate the warning in the image space using the type of the pose of the user received from the pose detector 148. For example, the warning generator 160 can modify a region of FOV that the warning occupies depending on the type of the pose, such as to expand the warning if the user is determined to be standing up. The warning generator 160 can select, using the type of the pose of the user, one or more extents of the warning or changes to extents of the warning (e.g., portions of the FOV in which to present the warning), and update the warning based on the selected extents. For example, the warning generator 160 can select the one or more extents to increase the FOV responsive to determining that the type of the pose indicates that the user is standing up (e.g., as compared to determining that the user is sitting down, in which case a relatively small portion of the FOV may be used to present the warning).

The warning generator 160 can determine the FOV of the HMD in any of a variety of ways. For example, the warning generator 160 can query the HMD for data regarding the FOV. The warning generator 160 can identify at least one of resolution of images displayed by the HMD (e.g., based on operation of the image renderer 168) or a size of displays 172 to determine the FOV.

In some embodiments, the warning generator 160 processes the collision data received from the collision detector 132 to determine an extent of the one or more obstacles in the FOV. For example, the warning generator 160 can evaluate the collision data on a more granular basis than determining whether to generate a warning on a single obstacle basis, such as by evaluating the collision data on a pixel-by-pixel or groups of pixel basis. For example, the warning generator 160 can identify multiple subsets of one or more pixels that correspond to a selected obstacle of the one or more obstacles. The warning generator 160 can identify collision data corresponding to each subset of one or more pixels, and evaluate each subset to determine whether the collision data corresponding to the subset indicates a warning should be generated (e.g., for a particular subset of pixels, determine whether the subset of pixels satisfies the corresponding thresholds). Responsive to determining to generate a warning for the subset, the warning generator 160 can assign the subset of pixels as the extent of the obstacle.

In some embodiments, the warning generator 160 uses a distance between the position of the user (e.g., as determined by motion detector 120) and the position of the obstacle to determine an angular range corresponding to the obstacle, such that as the distance decreases, the angle increases. For example, the warning generator 160 can determine an angular range corresponding to an angular size of an appearance of the obstacle within the FOV of the user. The warning generator 160 can assign a weight to each pixel representing the obstacle based on the distance between the position of the user and the position of the obstacle (e.g., greater weight as the distance decreases).

The warning generator 160 can always show the warning (e.g., when the warning is determined to be triggered) within the FOV, which can ensure that the warning is presented to the user regarding obstacles that the user may be approaching backwards or sideways. For example, responsive to determining to trigger the warning, the warning generator 160 can compare a direction of the user (e.g., based on sensor data received from sensors 104 or motion data received from motion detector 120) to a direction towards the obstacle that triggered the warning. Responsive to an angle between the direction of movement and the direction towards the obstacle being greater than an extent of the FOV (e.g., an angle from a center of the FOV to an edge of the FOV), the warning generator 160 can determine to present the warning on an edge of the FOV. For example, if the user is facing forwards or moving forwards but there is an obstacle to the left and behind the user, the angle between the direction of the user and the direction towards the obstacle may be greater than the extent of the FOV, such as the angle from the direction of the user to the left edge of the FOV being between 70 and 85 degrees, while the angle from the direction of the user to the direction towards the obstacle is between 150 and 175 degrees (measured counter-clockwise from the direction of the user or the center of the FOV). The warning generator 160 can determine to present warning regarding the obstacle behind the user along the left edge of the FOV.

In some embodiments, the warning generator 160 modifies how the warning is generated regarding obstacles in the periphery of the FOV or behind the user using the type of the pose of the user received from the pose detector 148. For example, the warning generator 160 can adjust a threshold associated with a difference between the direction of the user to an edge of the FOV and from the direction of the user to the obstacle responsive to which the warning is triggered, or adjust an intensity or other feature of the warning regarding obstacles in the periphery or behind the user. The warning generator 160 may modify how the warning is generated so that the threshold is decreased or the intensity is increased responsive to types of poses in which the user is expected to be moving more or is more likely to turn around (e.g., standing up as compared to sitting down).

In some embodiments, the warning is an audio warning or a haptic warning such as a vibration on the hand device 224. For example, the warning generator 160 can cause the hand device 224 to output an audio warning or haptic warning if the hand holding that device is about to collide with an object or a vibration on the HMD if the head is about to strike an object.

The warning generator 160 can provide instructions to the image renderer 168 with the warning to cause the image renderer 168 to apply various display effects for displaying the warning at the periphery of the FOV to facilitate user awareness of the warning. For example, the image renderer 168 can increase at least one of an intensity or a contrast associated with the warning at the periphery of the FOV, such as to cause the warning to having a glow appearance.

In some embodiments, the warning generator 160 uses depth map data from the depth mapper 144 to generate the warning to include a representation of the one or more obstacles. For example, the warning generator 160 can use the depth map data to monitor positions of the one or more obstacles, including objects that may be moving in the real world environment. The warning generator 160 can periodically sample the depth map data to use the depth map data as distance to collision data as the relative distances between the user and the one or more obstacles change, and evaluate the depth map data to determine whether to generate the warning (as well as to determine the parameters of the warning).

In some embodiments, the warning generator 160 (or the image renderer 168) uses the depth map data to generate display data regarding the one or more obstacles. For example, the warning generator 160 can use the depth map data to determine the pixels to use to display the one or more obstacles. In some embodiments, the warning generator 160 generates the display data regarding the one or more obstacles in a manner different than used to display the virtual environment, to help distinguish the real world obstacles from objects in the virtual environment. The warning generator 160 can apply peripheral scaling factors as described herein (e.g., relatively higher intensity at the periphery of the FOV of the HMD) to the display data regarding the one or more obstacles generated using depth map data.

The processing circuitry 116 can include a simulation generator 164. The simulation generator 164 can include any function, operation, routine, logic, or instructions to perform functions such as operating an application, such as a game, trainer, or simulator, receive user input data, update the operation of the application based on the user input data, and provide display data to the image renderer 168 to enable the image renderer 168 to render display images for displaying the virtual environment. The simulation generator 164 can receive sensor data from the sensors 104 or motion data from the motion detector 120, such as data regarding movement of the head or hands of the user, process the sensor data or motion data to identify the user input data, and update the operation of the application based on the identified user input data. For example, the simulation generator 164 can use the motion detector 120 to detect a movement of a hand of the user, such as a swing, push, or pull, and use the movement as a user input for the application.

The simulation generator 164 can generate depth buffer information corresponding to the display data, enabling the image renderer 168 to render 3D image data. The simulation generator 164 can receive depth map data from the depth mapper 144 regarding the one or more obstacles to operate the application or generate the display data using the depth map data.

The processing circuitry 116 can include an image renderer 168. The image renderer 168 can be a 3D image renderer. The image renderer 168 may use image related input data to process, generate and render display or presentation images to display or present on one or more display devices, such as via an HMD. The image renderer 168 can generate or create 2D images of a scene or view for display on display 172 and representing the scene or view in a 3D manner. The image renderer 168 can generate images for display on display 172 based on display data received from the simulation generator 164 (e.g., depth buffers received from the simulation generator 164) as well as the warning generator 160 (e.g., display data indicating where and how to display warnings). The display or presentation data to be rendered can include geometric models of 3D objects in the scene or view. The image renderer 168 may determine, compute or calculate the pixel values of the display or image data to be rendered to provide the desired or predetermined 3D image(s), such as 3D display data for the images 112 captured by the sensor 104.

The image renderer 168 can render frames of display data to one or more displays 172 based on temporal and/or spatial parameters. The image renderer 168 can render frames of image data sequentially in time, such as corresponding to times at which images are captured by the sensors 104 or at which frames of display data are received from simulation generator 164. The image renderer 168 can render frames of display data based on changes in position and/or orientation, such as the position and orientation of the HMD as indicated by sensors 104. The image renderer 168 can render frames of display data based on left-eye view(s) and right-eye view(s) such as displaying a left-eye view followed by a right-eye view or vice-versa.

The image renderer 168 can generate the display images using motion data regarding movement of the sensors 104. For example, the sensors 104 may change in at least one of position or orientation due to movement of a head of the user wearing an HMD that includes the sensors 104 (e.g., as described with reference to HMD system 200 of FIG. 2). The processing circuitry 116 can receive the sensor data from a position sensor (e.g., position sensor 220 described with reference to FIG. 2).

Although the image renderer 168 is shown as part of the processing circuitry 116, the image renderer may be formed as part of other processing circuitry of a separate device or component, such as the display device, for example within the HMD.

The system 100 can include one or more displays 172. The one or more displays 172 can be any type and form of electronic visual display. The displays may have or be selected with a predetermined resolution and refresh rate and size. The one or more displays can be of any type of technology such as LCD, LED, ELED or OLED based displays. The form factor of the one or more displays may be such to fit within the HMD as glasses or goggles in which the display(s) are the leans within the frame of the glasses or goggles. The displays 172 may have a refresh rate the same or different than a rate of refresh or frame rate of the processing circuitry 116 or the image renderer 168, the simulation generator 164, or the sensors 104.

Referring now to FIG. 2, in some implementations, an HMD system 200 can be used to implement the system 100. The HMD system 200 can include an HMD body 202, a left sensor 104a (e.g., left image capture device), a right sensor 104b (e.g., right image capture device), and the display 172. The HMD body 202 can have various form factors, such as glasses or a headset. The sensors 104a, 104b can be mounted to or integrated in the HMD body 202. The left sensor 104a can capture first images corresponding to a first view (e.g., left eye view), and the right sensor 104b can capture images corresponding to a second view (e.g., right eye view). In some embodiments, the HMD system 200 does not include image capture devices. The HMD system 200 can be used to implement VR functionality, such as to present a virtual environment via the display 172.

The HMD system 200 can include a top sensor 104c (e.g., top image capture device). The top sensor 104c can capture images corresponding to a third view different than the first view or the second view. For example, the top sensor 104c can be positioned between the left sensor 104a and right sensor 104b and above a baseline between the left sensor 104a and right sensor 104b. This can enable the top sensor 104c to capture images with depth information that may not be readily available to be extracted from the images captured by the left and right sensors 104a, 104b. For example, it may be difficult for depth information to be effectively extracted from images captured by the left and right sensors 104a, 104b in which edges (e.g., an edge of a table) are parallel to a baseline between the left and right sensors 104a, 104b. The top sensor 104c, being spaced from the baseline, can capture the third image to have a different perspective, and thus enable different depth information to be extracted from the third image, than the left and right sensors 104a, 104b.

The HMD system 200 can include processing circuitry 116, which can perform at least some of the functions described with reference to FIG. 1, including receiving sensor data from position sensors 104 (e.g., head tracking sensors) to detection movement of the HMD and generate warnings regarding potential collisions with obstacles based on the movement of the HMD. The processing circuitry 116 can be located in one or more of the HMD body 202, the client device 208, the server 212, the hand device 224, or various combinations thereof.

The HMD system 200 can include communications circuitry 204. The communications circuitry 204 can be used to transmit electronic communication signals to and receive electronic communication signals from at least one of a client device 208 or a server 212. The communications circuitry 204 can include wired or wireless interfaces (e.g., jacks, antennas, transmitters, receivers, transceivers, wire terminals) for conducting data communications with various systems, devices, or networks. For example, the communications circuitry 204 can include an Ethernet card and port for sending and receiving data via an Ethernet-based communications network. The communications circuitry 204 can communicate via local area networks (e.g., a building LAN), wide area networks (e.g., the Internet, a cellular network), and/or conduct direct communications (e.g., NFC, Bluetooth). The communications circuitry 204 can conduct wired and/or wireless communications. For example, the communications circuitry 204 can include one or more wireless transceivers (e.g., a Wi-Fi transceiver, a Bluetooth transceiver, a NFC transceiver, a cellular transceiver). For example, the communications circuitry 204 can establish wired or wireless connections with the at least one of the client device 208 or the server 212. The communications circuitry 204 can establish a USB connection with the client device 208.

The HMD system 200 can be deployed using different architectures. In some embodiments, the HMD (e.g., HMD body 202 and components attached to the HMD body 202) comprises the processing circuitry 116 and is self-contained portable unit. In some embodiments, the HMD has portions of the processing circuitry 116 that work in cooperation with or in conjunction with any type of portable or mobile computing device or companion device that has the processing circuitry or portions thereof, such as in the form of a staging device, a mobile phone or wearable computing device. In some embodiments, the HMD has portions of the processing circuitry 116 that work in cooperation with or in conjunction with processing circuitry, or portions thereof, of a desktop computing device. In some embodiments, the HMD has portions of the processing circuitry 116 that works in cooperation with or in conjunction with processing circuitry, or portions thereof, of a server computing device, which may be deployed remotely in a data center or cloud computing environment. In any of the above embodiments, the HMD or any computing device working in conjunction with the HMD may communicate with one or more servers in performing any of the functionality and operations described herein.

The client device 208 can be any type and form of general purpose or special purpose computing device in any form factor, such as a mobile or portable device (phone, tablet, laptop, etc.), or a desktop or personal computing (PC) device. In some embodiments, the client device can be a special purpose device, such as in the form of a staging device, which may have the processing circuitry or portions thereof. The special purpose device may be designed to be carried by the user while wearing the HMD, such as by attaching the client device 208 to clothing or the body via any type and form of accessory attachment. The client device 208 may be used to perform any portion of the image and rendering processing pipeline described in connection with FIGS. 1 and 3. The HMD may perform some or other portions of the image and rendering processing pipeline such as generating display images of a virtual environment and rendering the display images to the display 164. The HMD can transmit and receive data with the client device 208 to leverage the client device 208's computing power and resources which may have higher specifications than those of the HMD.

The server 212 can be any type of form of computing device that provides applications, functionality or services to one or more client devices 208 or other devices acting as clients. In some embodiments, the server 212 can be a client device 208. The server 212 can be deployed in a data center or cloud computing environment accessible via one or more networks. The HMD and/or client device 208 can use and leverage the computing power and resources of the server 212. The HMD and/or client device 208 can implement any portion of the image and rendering processing pipeline described in connection with FIGS. 1 and 3. The server 212 can implement any portion of the image and rendering processing pipeline described in connection with FIGS. 1 and 3, and in some cases, any portions of the image and rendering processing pipeline not performed by client device 208 or HMD. The server 212 may be used to update the HMD and/or client device 208 with any updated to the applications, software, executable instructions and/or data on the HMD and/or client device 208.

The system 200 can include a position sensor 220. The position sensor 220 can output at least one of a position or an orientation of the body 202. As the image capture devices 104a, 104b, 104c can be fixed to the body 202 (e.g., at predetermined locations relative to the position sensor 220), the position sensor 220 can output at least one of a position or an orientation of each sensor 104a, 104b, 104c, which can be used for depth mapping of obstacles detected via the image capture devices 104a, 104b, 104c. The position sensor 220 can include at least one of an inertial measurement unit (IMU), an accelerometer, a gyroscope, or a magnetometer (e.g., magnetic compass).

The system 200 can include at least one hand device 224. The hand device 224 can be sized and shaped to be held by one or more hands of a user. The hand device 224 can operate as a user control device; for example, the hand device 224 can include various user interface elements (e.g., buttons, switches, toggles, etc.) that can be manipulated by a user to generate user inputs. For example, the hand device 224 can be used as a controller for interacting with a virtual environment being presented via the display 164 based on operation of an application by the HMD system 200. The hand device 224 can communicate with the communications circuitry 204, client device 208, and/or server 212 using various wired or wireless connections. The hand device 224 can include one or more position sensors 228, which can be similar to the position sensor 220. For example, the position sensor 228 can include at least one of an inertial measurement unit (IMU), an accelerometer, a gyroscope, or a magnetometer (e.g., magnetic compass), which can output sensor data including at least one of a position, a velocity, an acceleration, or an orientation of the hand device 224 in order for processing circuitry 116 to use the sensor data to detect movement of one or more hands of the user to determine whether to generate warnings regarding potential collisions between the one or more hands of the user and obstacles in a real world environment around the HMD 200. The processing circuitry 116 can be located in one or more of the HMD body 202, the client device 208, and the server 212. The operations of the processing circuitry 116 can be shared among circuitry associated with the body 202, the client device 208, and the server 212.

Figure 3:
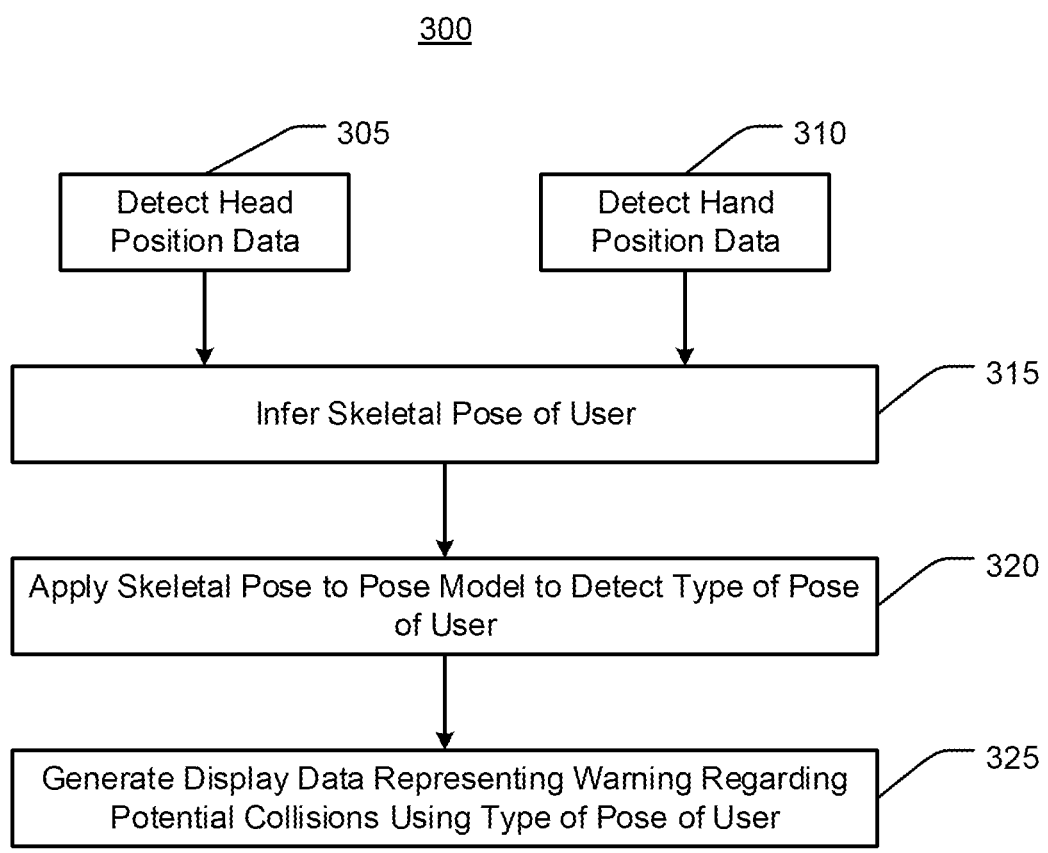
FIG. 3 is a flow diagram of a method for generating dynamic obstacle collision warnings based on detecting a type of a pose of a user according to an implementation of the present disclosure.

Referring now to FIG. 3, a method 300 for generating dynamic obstacle collision warnings based on detecting a pose of a user is illustrated. In some embodiments, the method 300 can include one or more of the following steps. The method 300 can include detecting head position data regarding a head of a user (305). The method 300 can include detecting hand position data regarding one or more hands of the user (310). The method 300 can include inferring a skeletal pose of the user (315). The method can include applying the skeletal pose to a pose model to detect a type of the pose of the user (320). The method can include generating display data representing a warning regarding a potential collision with one or more obstacles using the type of the poser of the user (325).

Referring to FIG. 3 in greater detail, at 305, head position data regarding the head of the user is detected. The head position data can be detected by sampling sensor data from one or more head tracking sensors, which may be coupled to the HMD that the user is wearing. The head position data can be processed to determine at least one of a position, a velocity, an acceleration, or an orientation (e.g., direction) of the head or movement of the head of the user. The head position data can be periodically detected, or responsive to a request for the head position data.

At 310, hand position data regarding one or more hands of the user is detected. The hand position data can be detected by sampling sensor data from one or more hand tracking sensors, which may be coupled to the hand device that the user is manipulating. The hand position data can be processed to determine at least one of a position, a velocity, an acceleration, or an orientation (e.g., direction) of the one or more hands or movement of the one or more hands of the user. The hand position data can be periodically detected, or responsive to a request for the hand position data.

In some embodiments, reference points are extracted from the head position data and the hand position data. For example, various filters or selection policies can be applied to the head position data and the hand position data to select the reference points, such as to identify a subset of points in space representing each of the head of the user and the one or more hands of the user. The reference points may be extracted at the same sample rate or a lower sample rate than the hand position data or the head position data. In some embodiments, hand position data and head position data are independently evaluated to determine the pose of the user.

At 315, a skeletal pose of the user is inferred using sensor data, such as the hand position data and the head position data. For example, the skeletal pose can be inferred using the reference points extracted from the hand position data and the head position data. The skeletal pose can be inferred by providing the sensor data to a skeletal inference model. The skeletal inference model can be generated and updated based on parameters such as height, reach, limb lengths, and distances between the head and hands in different poses or arrangements to infer the skeletal pose. The skeletal inference model can determine a confidence score regarding one or more expected poses. The skeletal inference model can update the confidence score regarding each of the one or more expected poses responsive to receiving the sensor data (e.g., responsive to updates to the sensor data). The skeletal pose can be inferred at a rate at which sensor data is detected or received, or at a lower rate, including but not limited to inferring the skeletal pose based on a time average or other combination of several sensor data samples.

In some embodiments, the skeletal pose is inferred using a body model. The body model can be generated and updated using the sensor data. For example, the body model can maintain parameters such as reach or height of the user. The body model can periodically update the maintained parameters responsive to the sensor data, such as by updating the maintained parameters each time the sensor data is received or at a lower rate. The skeletal inference model can use the parameters of the body model to infer the expected skeletal pose of the user, such as to determine from the sensor data a distance from the hands to the head and use the reach of the user to determine a confidence score of the skeletal pose corresponding to the distance from the hands to the head and the reach of the user.

In some embodiments, the position data from the head sensors, hand sensors, or both, is smoothed prior to using the position data to determine the pose of the user. For example, a previous set of position, orientation, velocity, or acceleration data samples can be monitored. The previous set can include a number of data samples (e.g., 10 data samples) or a number of data samples corresponding to a duration of time (e.g., 0.15 seconds of data samples). The number of data samples used to smooth the motion data can be dynamically adjusted based on factors such as processing demand or a frequency at which warnings are triggered. The position data can be smoothed by averaging the position data over the number of data samples, or by decreasing a rate of change between each data sample to be less than a threshold rate of change (e.g., if the velocity at a first point in time is 1 meter per second, and the velocity at a second point in time is 1.5 meters per second, decreasing the rate of change of 0.5 meters per second per second to be less than or equal to a threshold rate of change, such as 0.25 meters per second per second, such that the value used for the data sample at the second point in time is 1.25 meters per second).

At 320, the skeletal pose determined by the skeletal pose model is applied to one or more pose models to detect a type of the pose of the user. The type of the pose of the user can be detected to be one or more of several types of poses, such as by assigning confidence scores to each of the types of poses. The pose model can include one or more machine learning models trained to output the type of the pose using training data corresponding to skeletal poses, sensor data, or various combinations thereof. The pose model can output the type of the pose responsive to receiving the expected skeletal pose from the skeletal pose model. The pose model can also use the sensor data (e.g., from the head tracker and hand trackers) to determine the type of the pose. The machine learning model can be updated using the sensor data (e.g., further trained using the sensor data).

In some embodiments, the pose model detects a change in the type of the pose of the user. For example, the pose model can periodically determine the type of the pose of the user, and output an indication that the pose of the user has changed, such as if confidence scores associated with various types of poses change in relative value or compared to a minimum confidence threshold.

At 325, a warning is generated regarding potential collisions of the user with one or more obstacles in an environment around the user using the type of the pose of the user. Collision data regarding the obstacles can be determined using various sensor data, such as collision data indicating distances to objects. The warning can be generated based on evaluating the collision data by applying various filters, functions, or other processes to the collision data to determine if and how to display the warning. The warning can be generated based on comparing the collision data to respective thresholds (e.g., before or after applying filters, functions, or other processes). Parameters of the warning, such as magnitude (e.g., brightness, intensity), position, contrast, color, frequency, or intermittency, can be determined based on the collision data. For example, an intensity of the warning can increase as the time to collision decreases.

The warning can be generated using the type of the pose of the user by updating the thresholds, the parameters of the warning, or various combinations thereof responsive to the type of the pose of the user. For example, if the type of the pose of the user indicates that the user is sitting down, the thresholds may be decreased in magnitude (e.g., the warning is triggered when the user is closer to the obstacles because the likelihood that the user will suddenly collide with the obstacles is expected to be less). A portion of the field of view of the user used to present the warning can be adjusted responsive to the type of the pose of the user, such as for obstacles at the periphery of the field of view or behind the user.

In some embodiments, the warning is updated responsive to the type of the pose of the user at a rate at which the type of pose is determined. In some embodiments, the warning is updated responsive to a change in the type of the pose of the user. For example, the type of the pose of the user can be monitored to detect a transition between types, and the warning can be updated responsive to detecting the transition between types.

In some embodiments, different weights can be applied to the head position data and the hand position data to determine the type of the pose of the user. For example, a greater weight can be assigned to data regarding the head of the user than data regarding the one or more hands of the user, as there may be greater variability in the positions of the hands across various types of poses as compared to the position of the head.

In some embodiments, the warning generation is controlled based on a warning rate. For example, the warning rate can correspond to a number of frames of displayed images in which the warning is displayed (or when the warning is displayed with a magnitude greater than a threshold magnitude, such as if a minimal warning is often or always displayed) relative to a total number of displayed images. The warning rate can indicate a rate of immersion loss. The functions or thresholds used to determine whether to generate warnings or the parameters associated with the warnings can be adjusted to maintain the warning rate within a target range. For example, the warning rate over a particular period of time (e.g., previous number of seconds or minutes; previous usages of the application; previous use of the HMD) can be monitored, and compared to at least one of a minimum threshold or a maximum threshold; responsive to the warning rate not being outside the at least one of the minimum threshold or the maximum thresholds, the thresholds used to determine whether to trigger the warning can be adjusted so that the warning rate will increase or decrease as appropriate. In some embodiments, the thresholds used to determine whether to trigger the warning have absolute limits, which can ensure that the thresholds are not adjusted to a point at which it may be difficult for a user to react in time to avoid collisions when the warnings are displayed.

The warning can be generated responsive to a user model. The user model can include a machine learning model trained to generate the warning or trigger generation of the warning based on collision data as well as indications of when collisions occur or factors regarding when immersion is lost. The collision data can be used to update the user model. The collision data can be provided to the user model to cause the user model to generate the thresholds or parameters used to generate the warning based on the collision data. The user model can be updated using the body model or the detected poses of the user.

In some embodiments, the warning is generated by mapping the location of portions of the one or more obstacles that trigger the warning to pixels of the display of the HMD. For example, the location of the portions of the one or more obstacles can be periodically sampled and updated (e.g., while the user is moving), and pixels in an image space of the images displayed by the HMD can be identified based on a direction of the user or a FOV of the HMD and the locations. In some embodiments, an angular range of pixels is used to represent the one or more obstacles in the FOV, and the angular range can be scaled based on the distance between the user and the one or more obstacles. In some embodiments, the one or more obstacles may be located outside the FOV, in which case the warning can be presented along edges or edge portions of the FOV.

The warning can be generated using icons, labels, or representations of the one or more obstacles to warn the user of the HMD of the potential collision. For example, the warning can be generated to include display data indicating gridded elements representing the one or more obstacles (e.g., gridded walls). The warning can be generated to correspond to a real-world location of the one or more obstacles relative to a direction of movement of the user, such that the warning can indicate the real-world location within the virtual environment that the user perceives. As described above, the warning can be generated at edge or edge portions of the FOV of the HMD, such as if the one or more obstacles are to the side of or behind the user, and can be modified responsive to the type of the pose of the user. The warning can be displayed with each image that is displayed by the HMD, or can be displayed at a different frame rate that the images displayed by the HMD. The warning can be displayed using depth map data regarding the one or more obstacles. The warning can be presented as an overlay in the virtual environment displayed using the HMD. In some embodiments, the warning is an audio warning or a haptic warning such as a vibration on the hand device if the hand holding that device is about to collide with an object or a vibration on the head worn display if the head is about to strike an object.

The method 300 or steps or operations thereof can be performed based on various conditions. The method 300 can be performed responsive to detecting that the HMD or VR system is in an initialization, restart, or setup mode, such as to calibrate the locations of the one or more obstacles relative to the HMD. In some embodiments, the method 300 is performed on a periodic basis, such as to periodically detect motion data and determine whether potential collisions may occur based on the motion data. The method 300 can be performed responsive to user input, such as user input indicating instructions to detect potential collisions or to refresh the warning (e.g., present a partial or complete indication of the locations of the one or more obstacles, even if a warning would not otherwise be triggered).

Figure 4:
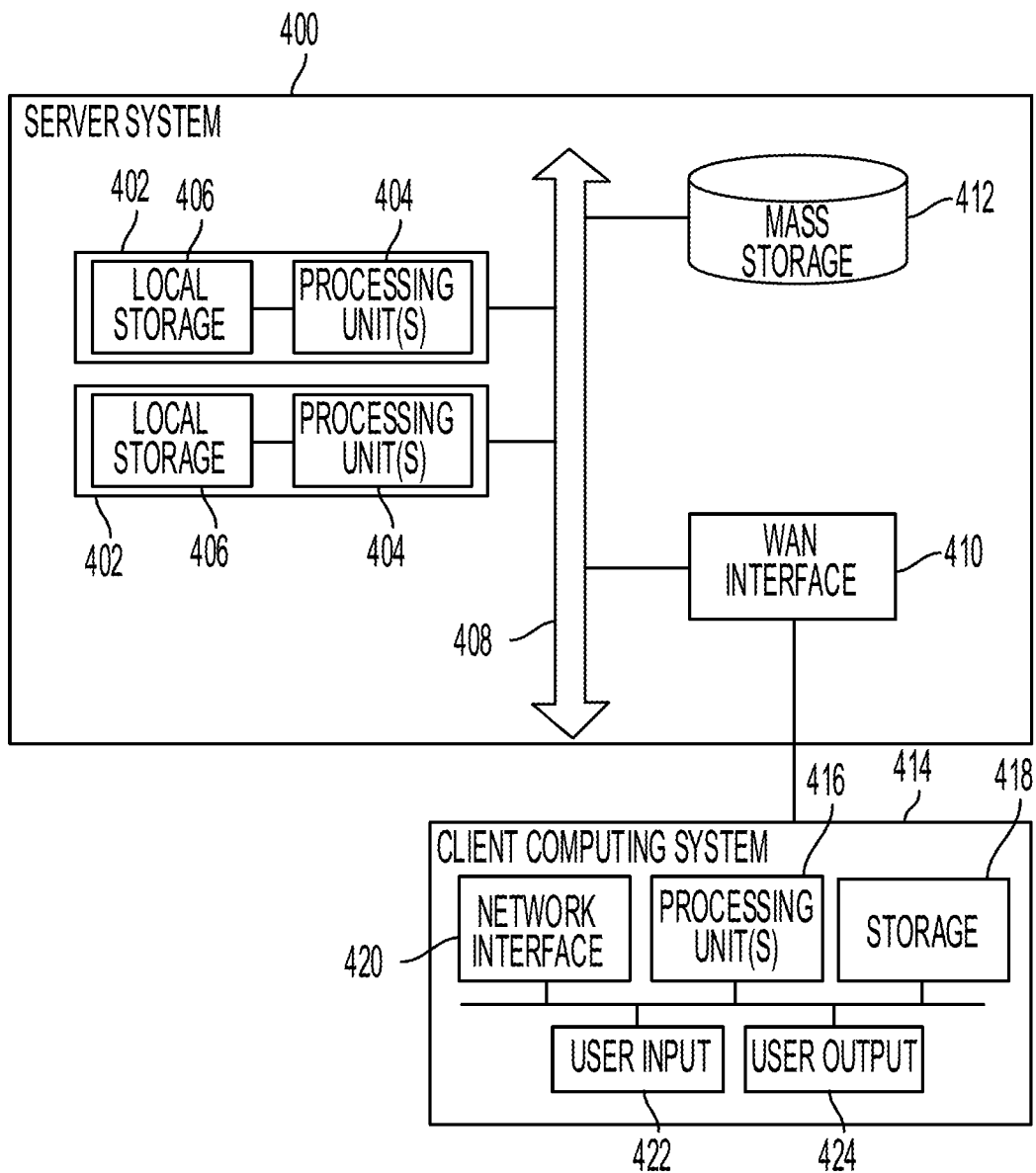
FIG. 4 is a block diagram of a computing environment according to an implementation of the present disclosure.

Various operations described herein can be implemented on computer systems. FIG. 4 shows a block diagram of a representative server system 400 and client computer system 414 usable to implement the present disclosure. Server system 400 or similar systems can implement services or servers described herein or portions thereof. Client computer system 414 or similar systems can implement clients described herein. Each of the systems 100, 200 and others described herein can incorporate features of the systems 400, 414.

Server system 400 can have a modular design that incorporates a number of modules 402 (e.g., blades in a blade server); while two modules 402 are shown, any number can be provided. Each module 402 can include processing unit(s) 404 and local storage 406.

Processing unit(s) 404 can include a single processor, which can have one or more cores, or multiple processors.

Processing unit(s) 404 can include a general-purpose primary processor as well as one or more special-purpose co-processors such as graphics processors, digital signal processors, or the like. Some or all processing units 404 can be implemented using customized circuits, such as application specific integrated circuits (ASICs) or field programmable gate arrays (FPGAs). Such integrated circuits execute instructions that are stored on the circuit itself. Processing unit(s) 404 can execute instructions stored in local storage 406. Any type of processors in any combination can be included in processing unit(s) 404.

Local storage 406 can include volatile storage media (e.g., conventional DRAM, SRAM, SDRAM, or the like) and/or non-volatile storage media (e.g., magnetic or optical disk, flash memory, or the like). Storage media incorporated in local storage 406 can be fixed, removable or upgradeable as desired. Local storage 406 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 404 need at runtime. The ROM can store static data and instructions that are needed by processing unit(s) 404. The permanent storage device can be a non-volatile read-and-write memory device that can store instructions and data even when module 402 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

Local storage 406 can store one or more software programs to be executed by processing unit(s) 404, such as an operating system and/or programs implementing various server functions such as functions of the system 100, or any other system described herein, or any other server(s) associated with the system 100 or any other system described herein.

"Software" refers generally to sequences of instructions that, when executed by processing unit(s) 404 cause server system 400 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 404. Software can be implemented as a single program or a collection of separate programs or program modules that interact as desired. From local storage 406 (or non-local storage described below), processing unit(s) 404 can retrieve program instructions to execute and data to process in order to execute various operations described above.

In some server systems 400, multiple modules 402 can be interconnected via a bus or other interconnect 408, forming a local area network that supports communication between modules 402 and other components of server system 400. Interconnect 408 can be implemented using various technologies including server racks, hubs, routers, etc.

A wide area network (WAN) interface 410 can provide data communication capability between the local area network (interconnect 408) and a larger network, such as the Internet. Conventional or other activities technologies can be used, including wired (e.g., Ethernet, IEEE 802.3 standards) and/or wireless technologies (e.g., Wi-Fi, IEEE 802.11 standards).

Local storage 406 can provide working memory for processing unit(s) 404, providing fast access to programs and/or data to be processed while reducing traffic on interconnect 408. Storage for larger quantities of data can be provided on the local area network by one or more mass storage subsystems 412 that can be connected to interconnect 408. Mass storage subsystem 412 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 412. Additional data storage resources may be accessible via WAN interface 410 (potentially with increased latency).

Server system 400 can operate in response to requests received via WAN interface 410. For example, one of modules 402 can implement a supervisory function and assign discrete tasks to other modules 402 in response to received requests. Conventional work allocation techniques can be used. As requests are processed, results can be returned to the requester via WAN interface 410. Such operation can generally be automated. WAN interface 410 can connect multiple server systems 400 to each other, providing scalable systems capable of managing high volumes of activity. Conventional or other techniques for managing server systems and server farms (collections of server systems that cooperate) can be used, including dynamic resource allocation and reallocation.

Server system 400 can interact with various user-owned or user-operated devices via a wide-area network such as the Internet. An example of a user-operated device is shown in FIG. 4 as client computing system 414. Client computing system 414 can be implemented, for example, as a consumer device such as a smartphone, other mobile phone, tablet computer, wearable computing device (e.g., smart watch, eyeglasses), desktop computer, laptop computer, and so on.

For example, client computing system 414 can communicate via WAN interface 410. Client computing system 414 can include conventional computer components such as processing unit(s) 416, storage device 418, network interface 420, user input device 422, and user output device 424. Client computing system 414 can be a computing device implemented in a variety of form factors, such as a desktop computer, laptop computer, tablet computer, smartphone, other mobile computing device, wearable computing device, or the like.

Processor 416 and storage device 418 can be similar to processing unit(s) 404 and local storage 406 described above. Suitable devices can be selected based on the demands to be placed on client computing system 414; for example, client computing system 414 can be implemented as a "thin" client with limited processing capability or as a high-powered computing device. Client computing system 414 can be provisioned with program code executable by processing unit(s) 416 to enable various interactions with server system 400 of a message management service such as accessing messages, performing actions on messages, and other interactions described above. Some client computing systems 414 can also interact with a messaging service independently of the message management service.

Network interface 420 can provide a connection to a wide area network (e.g., the Internet) to which WAN interface 410 of server system 400 is also connected. Network interface 420 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 422 can include any device (or devices) via which a user can provide signals to client computing system 414; client computing system 414 can interpret the signals as indicative of particular user requests or information. User input device 422 can include any or all of a keyboard, touch pad, touch screen, mouse or other pointing device, scroll wheel, click wheel, dial, button, switch, keypad, microphone, and so on.

User output device 424 can include any device via which client computing system 414 can provide information to a user. For example, user output device 424 can include a display to display images generated by or delivered to client computing system 414. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 424 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 404 and 416 can provide various functionality for server system 400 and client computing system 414, including any of the functionality described herein as being performed by a server or client, or other functionality associated with message management services.

It will be appreciated that server system 400 and client computing system 414 are illustrative and that variations and modifications are possible. Computer systems used in connection with the present disclosure can have other capabilities not specifically described here. Further, while server system 400 and client computing system 414 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method, comprising:
   receiving, by one or more processors, sensor data regarding a user operating a head mounted display (HMD);
   applying, by the one or more processors, one or more models to the sensor data to determine a type of pose of the user; and
   establishing, by the one or more processors responsive to the type of the pose, a threshold for a mode of operation of the HMD that triggers a warning regarding a potential collision with one or more obstacles.

2. The method of claim 1, wherein the type of the pose of the user comprises a sitting pose, standing pose, or lying down pose.

3. The method of claim 2, wherein controlling the triggering of the warning comprises assigning, by the one or more processors, a first sensitivity of triggering the warning responsive to the type of the pose being the sitting pose or the lying down pose or a second sensitivity of triggering the warning responsive to the type of the pose being the standing pose, the first sensitivity different than the second sensitivity.

4. The method of claim 1, wherein selecting the mode of operating comprises modifying, by the one or more processors, the triggering of the warning responsive to detecting a transition between poses.

5. The method of claim 1, wherein applying the one or more models to the sensor data comprises:
identifying, from the sensor data, a plurality of reference points of the user; and
applying the one or more models to the plurality of reference points.

6. The method of claim 5, further comprising using the plurality of reference points to establish, by the one or more processors, a skeletal inference model.

7. The method of claim 1, further comprising generating, by the one or more processors, display data for presenting the warning.

8. A system, comprising:
one or more processors configured to:
receive sensor data regarding a user operating a head mounted display (HMD);
apply one or more models to the sensor data to determine a type of the pose of the user; and
establish, responsive to the type of the pose, a threshold for a mode of operation of the HMD that triggers a warning regarding a potential collision with one or more obstacles.

9. The system of claim 8, wherein the type of the pose of the user comprises a sitting pose, standing pose, or lying down pose.

10. The system of claim 9, wherein the one or more processors are configured to control the triggering of the warning by assigning a first sensitivity of triggering the warning responsive to the type of the pose being the sitting pose or the lying down pose or a second sensitivity of triggering the warning responsive to the type of the pose being the standing pose, the first sensitivity different than the second sensitivity.

11. The system of claim 8, wherein the one or more processors are configured to select the method of operation by modifying the triggering of the warning responsive to detecting a transition between poses.

12. The system of claim 8, wherein the one or more processors are configured to apply the one or more models to the sensor data by:
identifying, from the sensor data, a plurality of reference points of the user; and
applying the one or more models to the plurality of reference points.

13. The system of claim 12, wherein the one or more processors are configured to use the plurality of reference points to establish a skeletal inference model.

14. The system of claim 8, wherein the one or more processors are configured to generate display data for presenting the warning.

15. A system, comprising:
one or more processors configured to:
receive sensor data regarding a user operating a head wearable device;
apply one or more models to the sensor data to determine a type of the pose of the user; and
modify, responsive to the type of the pose, a threshold for triggering a warning by the head wearable device regarding a potential collision with one or more obstacles.

16. The system of claim 15, wherein the type of the pose of the user comprises a sitting pose, standing pose, or lying down pose.

17. The system of claim 15, wherein the one or more processors are configured to modify the threshold warning responsive to detecting a transition between poses.

18. The system of claim 15, wherein the one or more processors are configured to apply the one or more models to the sensor data by:
identifying, from the sensor data, a plurality of reference points of the user; and
applying the one or more models to the plurality of reference points.

19. The system of claim 18, wherein the one or more processors are configured to use the plurality of reference points to establish a skeletal inference model.

20. The system of claim 18, wherein the one or more processors are configured to generate display data for the head wearable device to present the warning.

* * * * *